United States Patent
Frydlewski et al.

(10) Patent No.: US 9,820,535 B2
(45) Date of Patent: *Nov. 21, 2017

(54) FASTENING DEVICES AND SYSTEMS AND METHODS THEREOF

(75) Inventors: Gaston Frydlewski, Brooklyn, NY (US); Maria R. Waingarten, Brooklyn, NY (US); Brian Legette, Baltimore, MD (US); David Reeb, Sykesville, MD (US); Alan Tipp, Bennington, NE (US)

(73) Assignee: HICKIES, Inc., Brooklyn, NY (US)

(*) Notice: Subject to any disclaimer, the term of this patent is extended or adjusted under 35 U.S.C. 154(b) by 161 days.

This patent is subject to a terminal disclaimer.

(21) Appl. No.: 14/377,103

(22) PCT Filed: Jun. 8, 2012

(86) PCT No.: PCT/US2012/041713
§ 371 (c)(1),
(2), (4) Date: Nov. 5, 2014

(87) PCT Pub. No.: WO2013/119268
PCT Pub. Date: Aug. 15, 2013

(65) Prior Publication Data
US 2015/0074955 A1  Mar. 19, 2015

(51) Int. Cl.
*A43C 1/02* (2006.01)
*A44B 17/00* (2006.01)
(Continued)

(52) U.S. Cl.
CPC ........ *A44B 17/0064* (2013.01); *A43B 3/0078* (2013.01); *A43C 11/22* (2013.01);
(Continued)

(58) Field of Classification Search
CPC .. A43C 1/003; A43C 1/02; A43C 1/00; A43C 9/00; A43C 11/22; A44B 99/00
(Continued)

(56) References Cited

U.S. PATENT DOCUMENTS 146,913 A    1/1874  Keith
315,819 A    4/1885  Naylon
(Continued)

FOREIGN PATENT DOCUMENTS

BR    6900021 U    4/1991
CN    1036129 A    10/1989
(Continued)

OTHER PUBLICATIONS

Office Action issued in Chinese Patent Application No. 2012810308271.4, dated Aug. 25, 2015.
(Continued)

*Primary Examiner* — Jack W Lavinder
(74) *Attorney, Agent, or Firm* — Venable LLP; Steven J. Schwarz; Elizabeth Gitlin

(57) ABSTRACT

Fastening devices and systems and methods thereof. Fastening devices and systems and methods thereof can include a unitary or one-piece body having first and second ends configured and operative to be coupled together or to be coupled to their respective complement in another of said fastening devices. The first end can include a ring or annular portion and a projection that are sized and shaped to fit around an anchor and in an orifice, respectively, of the second end. Fastening devices and systems and methods thereof according to embodiments may be used with items, including footwear, apparel, luggage, a backpack, a bag, a purse, a boxing glove, a punching bag, football or lacrosse shoulder pads, or the like.

22 Claims, 16 Drawing Sheets

(51) Int. Cl.
*A43B 3/00* (2006.01)
*A43C 11/22* (2006.01)

(52) U.S. Cl.
CPC ............ *A44B 17/0023* (2013.01); *Y10T 24/26* (2015.01); *Y10T 24/268* (2015.01); *Y10T 24/314* (2015.01); *Y10T 24/37* (2015.01); *Y10T 24/3787* (2015.01); *Y10T 24/45251* (2015.01); *Y10T 24/45277* (2015.01); *Y10T 29/49947* (2015.01)

(58) Field of Classification Search
USPC ............ 24/715.3, 712, 17 R, 17 B, 300, 301, 24/265 CD, 265 AL
See application file for complete search history.

(56) References Cited

U.S. PATENT DOCUMENTS

| | | | |
|---|---|---|---|
| 562,114 A | 6/1896 | Benford | |
| 565,884 A | 8/1896 | Emmons | |
| 672,506 A | 4/1901 | Godward | |
| 705,562 A | 7/1902 | Chipley | |
| 715,599 A | 12/1902 | Pitts | |
| 830,902 A | 9/1906 | Keller | |
| 976,826 A | 11/1910 | Obele | |
| 1,055,118 A | 3/1913 | Ziegllr | |
| 1,184,647 A | 5/1916 | Holloway | |
| 1,458,088 A | 6/1923 | Unnold | |
| 1,595,630 A | 8/1926 | Stockton | |
| 1,678,241 A | 7/1928 | Benz | |
| 1,685,489 A | 9/1928 | Jansen | |
| D89,286 S | 2/1933 | Rosenthal | |
| 1,898,225 A | 2/1933 | Szabo | |
| 1,934,455 A | 11/1933 | Staude et al. | |
| 1,945,932 A | 2/1934 | Caley | |
| 1,966,135 A | 7/1934 | Reh | |
| 2,264,644 A | 12/1941 | Santangelo | |
| 2,289,225 A | 7/1942 | Tonai | |
| 2,438,143 A | 3/1948 | Brown | |
| 2,689,991 A | 9/1954 | Fedankiw et al. | |
| D177,723 S | 5/1956 | Doherty | |
| D179,614 S | 1/1957 | Shafer | |
| 2,871,537 A | 2/1959 | Hickerson | |
| D194,177 S | 12/1962 | Swett | |
| 3,193,950 A | 7/1965 | Liou | |
| 3,382,546 A | 5/1968 | Palmay | |
| 3,522,635 A | 8/1970 | Nilsson | |
| 3,701,572 A | 10/1972 | Velasquez | |
| 3,731,350 A | 5/1973 | Diebold | |
| 4,112,988 A | 9/1978 | Nelson | |
| 4,144,621 A | 3/1979 | Green | |
| 4,296,515 A | 10/1981 | Hauser | |
| 4,486,965 A | 12/1984 | Friton | |
| 5,214,826 A | 6/1993 | Fortune | |
| 5,230,171 A | 7/1993 | Cardaropoli | |
| 5,239,732 A | 8/1993 | Steven | |
| 5,295,315 A | 3/1994 | Osawa et al. | |
| 5,388,315 A | 2/1995 | Jones | |
| 5,465,442 A | 11/1995 | Merser | |
| 5,537,763 A | 7/1996 | Donnadieu et al. | |
| 5,586,353 A | 12/1996 | Merser | |
| 5,639,244 A | 6/1997 | Stricklin | |
| 5,692,276 A | 12/1997 | Paxton | |
| D393,411 S | 4/1998 | Crowe | |
| 5,737,811 A | 4/1998 | Rashid | |
| 5,746,500 A | 5/1998 | Chien | |
| 5,799,376 A | 9/1998 | Harsley | |
| 5,822,844 A | 10/1998 | Mento | |
| D409,522 S | 5/1999 | Satterfield et al. | |
| 6,073,315 A | 6/2000 | Rasmussen | |
| D432,946 S | 10/2000 | Gorelick | |
| 6,313,406 B1 | 11/2001 | Gretz | |
| 6,401,304 B1 | 6/2002 | Dossett | |
| 6,490,767 B2 | 12/2002 | Haiduk | |
| 6,513,210 B1 | 2/2003 | Gonzalez | |
| 6,634,063 B2 | 10/2003 | Joseph | |
| 6,701,589 B1 | 3/2004 | Kliewer | |
| D488,374 S | 4/2004 | Hussaini et al. | |
| D492,897 S | 7/2004 | Strange et al. | |
| D503,034 S | 3/2005 | Choi | |
| D513,880 S | 1/2006 | Domotor et al. | |
| D542,928 S | 5/2007 | Bauer | |
| D543,833 S | 6/2007 | Folk et al. | |
| D544,338 S | 6/2007 | Christensen et al. | |
| D579,764 S | 11/2008 | Kuhlmann | |
| 7,506,420 B2 * | 3/2009 | Frydlewski | A43C 11/00 24/713 |
| D590,705 S | 4/2009 | Kuhlmann | |
| D596,759 S | 7/2009 | Burke | |
| D599,196 S | 9/2009 | Ruffin et al. | |
| D614,855 S | 5/2010 | Inohara et al. | |
| D615,385 S | 5/2010 | Arendt | |
| D623,933 S | 9/2010 | Mallin et al. | |
| 7,825,337 B2 | 11/2010 | Young, IV | |
| D628,936 S | 12/2010 | Edelstein | |
| D637,065 S | 5/2011 | Krietzman et al. | |
| D637,066 S | 5/2011 | Krietzman et al. | |
| D641,708 S | 7/2011 | Yamauchi | |
| D662,987 S | 7/2012 | Ianke | |
| 8,261,416 B2 | 9/2012 | Rothbaum et al. | |
| D672,230 S | 12/2012 | Laverack et al. | |
| D678,000 S | 3/2013 | Lee et al. | |
| D686,909 S | 7/2013 | Frydlewski et al. | |
| 8,590,121 B1 | 11/2013 | Patt, Jr. et al. | |
| D698,232 S | 1/2014 | Weinberg | |
| D705,442 S | 5/2014 | Tipton et al. | |
| D724,935 S | 3/2015 | Warner | |
| D729,054 S | 5/2015 | Chen | |
| D734,605 S | 7/2015 | Van Der Pol | |
| D736,514 S | 8/2015 | Lach | |
| D752,333 S | 3/2016 | Van Der Pol | |
| 9,382,051 B2 | 7/2016 | Creato | |
| D774,879 S | 12/2016 | Martinson | |
| D776,990 S | 1/2017 | To | |
| 2002/0178559 A1 | 12/2002 | Hsu | |
| 2003/0140459 A1 | 7/2003 | Strange et al. | |
| 2004/0139583 A1 | 7/2004 | Wendle | |
| 2005/0251967 A1 | 11/2005 | McNeill | |
| 2005/0268435 A1 | 12/2005 | Moughelbay et al. | |
| 2006/0168785 A1 | 8/2006 | Kraft et al. | |
| 2006/0254089 A1 | 11/2006 | Frydlewski | |
| 2009/0235494 A1 | 9/2009 | Browne et al. | |
| 2009/0242439 A1 | 10/2009 | Talley | |
| 2009/0260267 A1 | 10/2009 | Evans | |
| 2010/0293767 A1 | 11/2010 | Talley | |
| 2010/0325849 A1 | 12/2010 | Clayton | |
| 2011/0058902 A1 | 3/2011 | Barbeau et al. | |
| 2011/0271491 A1 | 11/2011 | Clawson | |
| 2012/0180268 A1 | 7/2012 | Chen | |
| 2012/0192385 A1 | 8/2012 | Burdett et al. | |
| 2013/0199020 A1 | 8/2013 | Frydlewski et al. | |
| 2016/0325897 A1 | 11/2016 | Kierstead | |
| 2016/0338455 A1 | 11/2016 | Chuan | |
| 2016/0340093 A1 | 11/2016 | Muller | |

FOREIGN PATENT DOCUMENTS

| | | |
|---|---|---|
| CN | 3052239 | 12/1996 |
| CN | 3055530 | 3/1997 |
| CN | 3105681 | 3/1999 |
| CN | 1833567 A | 9/2006 |
| CN | 201139130 Y | 10/2008 |
| CN | 301041762 | 10/2009 |
| CN | 301257699 S | 6/2010 |
| CN | 301267166 A | 6/2010 |
| DE | 20 2012 012779.9 U1 | 3/2014 |
| FR | 958758 A | 3/1950 |
| JP | D2010-19098 | 7/2010 |
| JP | D1409037 | 3/2011 |
| NL | 002305581-0001 | 10/2013 |
| WO | WO-2013/066004 A1 | 5/2013 |

(56) References Cited

FOREIGN PATENT DOCUMENTS

WO   WO-2013/119268 A1   8/2013
WO   WO-2014/106974 A1   7/2014

OTHER PUBLICATIONS

International Search Report and Written Opinion in PCT International Application No. PCT/US14/56824, dated Dec. 16, 2014.
Office Action issued in U.S. Appl. No. 14/493,108 dated Apr. 16, 2015.
Office Action issued in Design U.S. Appl. No. 29/468,543 dated Jun. 16, 2015.
Office Action issued in Chinese Patent Application No. 201280069064.6 dated Jul. 24, 2015.
"Slastics Video English," https://vimeo.com/124641229, Aug. 13, 2015.
"Jazzy Sports Laces," https://www.youtube.com/watch?v=XzawtAIHzsw, Aug. 13, 2015.
"Koollaces Inc" http://www.koollaces.net/en/contents/index_3_1.php, Aug. 13, 2015.
"Strapz Team Spirit" http://so-mine.net/porkolio/strapz-team-spirit-3/, Aug. 13, 2015.
Substantive Examination Report issued in Philippines Patent Application No. 1/2014/501752 dated Mar. 17, 2015.
Office Action issued in Colombian Patent Application No. 14-171751 dated Jul. 7, 2015.
"Shop", 2014, 2 pages, accessed from the internet on Oct. 14, 2014 at <http://laceout.com/shop/>.
Notice of Allowance issued in U.S. Appl. No. 29/468,991 dated Sep. 2, 2014.
Notice of Allowance issued in U.S. Appl. No. 29/468,997 dated Sep. 25, 2014.
Notice of Allowance issued in U.S. Appl. No. 29/468,999 dated Sep. 9, 2014.
Office Action in Canadian Patent Application No. 2,831,406, dated Nov. 13, 2013.
Office Action in Chinese Patent Application No. 201230369100.3, dated Nov. 27, 2013.
Office Action in Chinese Patent Application No. 3162378, dated Dec. 3, 2013.
Extended European Search Report in European Patent Application No. 13153930.6, dated Apr. 7, 2014.
Office Action in Korean Patent Application No. 102300429 dated Aug. 8, 2013.
Search Report issued in Korean Patent Application No. 102300429 dated Jul. 18, 2013.
International Search Report and Written Opinion in PCT International Patent Application No. PCT/US12/41713, dated Aug. 17, 2012.
Office Action in U.S. Appl. No. 13/367,362, dated Apr. 16, 2014.
Notice of Allowance issued in U.S. Appl. No. 13/367,362, dated Aug. 7, 2014.
Notice of Allowance issued in U.S. Appl. No. 29/412,658, dated May 21, 2013.
Office Action in Chinese Patent Application No. 201210308271.4, dated Oct. 10, 2014.
Application for a Declaration of Invalidity of a Registered Community Design against Registered Community Design 002075341-0001, dated Oct. 7, 2014.
Yankz, http://www.yankz.com, retrieved Nov. 10, 2014.
U-Laces, http://www.u-lace.com, retrieved Nov. 10, 2014.
Laceout, http://www.laceout.com, retrieved Nov. 10, 2014.
Amazon, http://www.amazon.de/dp/B008EA8RHQ/ref=asc_df_B008EA8RHQ21?smid=AMD1KJ2RZKKOW&tag=ciao-jewelry-mp-21&linkCode=dfo&creative=22506&creativeASIN=B008EA8RHQ&childASIN=B008EE8RHQ, retrieved Oct. 7, 2014.
Amazon, http://www.amazon.de/Lizas-Lederarmband-geflochten-Kristallen-LIZA119/dp/B00KYW17VU/ref=sr_1_152?s=jewelry&ie=UTF8&qid=1412677656&sr=1-152, retrieved Oct. 7, 2014.
Bottega Veneta, http://www.bottegaveneta.com/de/weiteres-leder-accessoire_cod463670620h.html, retrieved Oct. 7, 2014.
Mr. Lacy, http://mr-lacy,com, retrieved Feb. 12, 2015.
UX Movement, "Why Rounded Corners are Easier on the Eyes", http://uxmovement.com/thinking/why-rounded-corners-are-easier-on-the-eyes/, retrieved on Feb. 12, 2015.
Extended European Search Report dated Jun. 26, 2017 in European Patent Application No. 14845433.3.
Notice of Allowance dated Mar. 13, 2017 in Design U.S. Appl. No. 29/561,464.
Office Action issued in U.S. Appl. No. 14/493,108 dated Mar. 18, 2016.
Office Action issued in U.S. Appl. No. 14/493,108 dated Dec. 11, 2015.

* cited by examiner

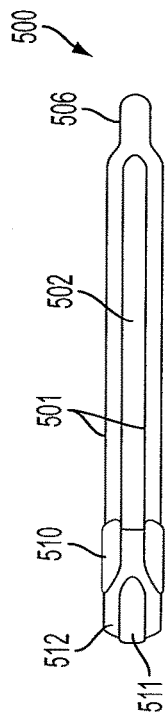
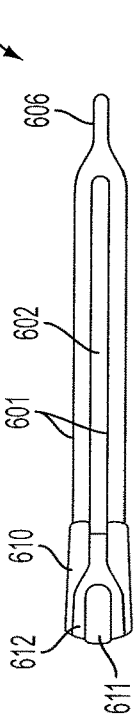
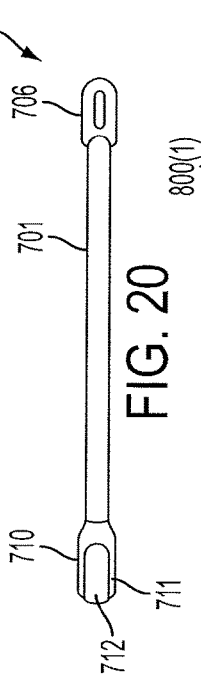
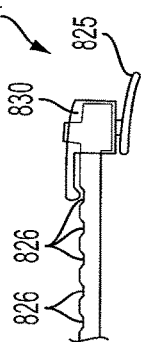
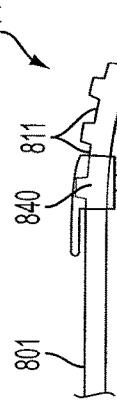
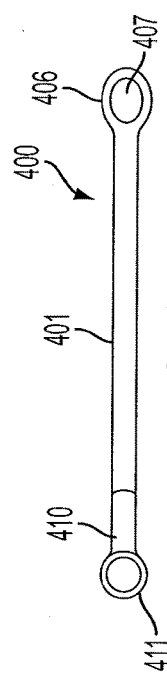
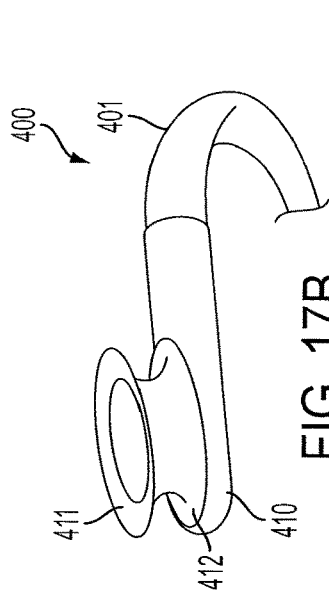
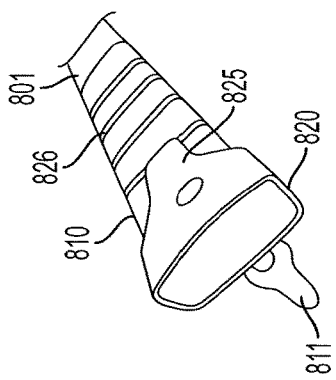

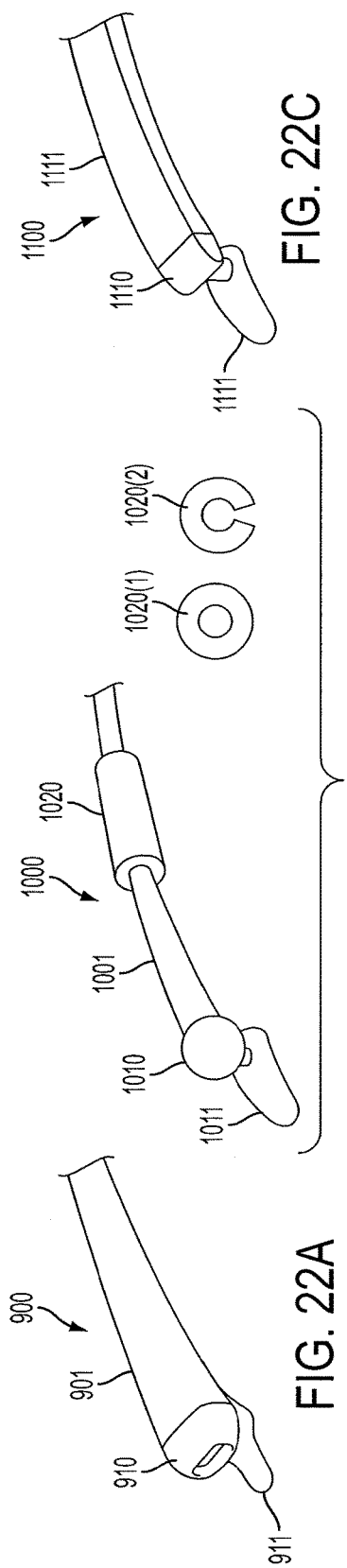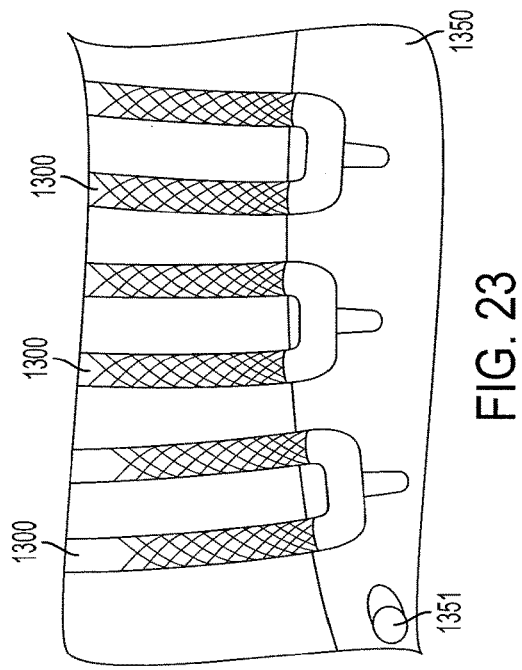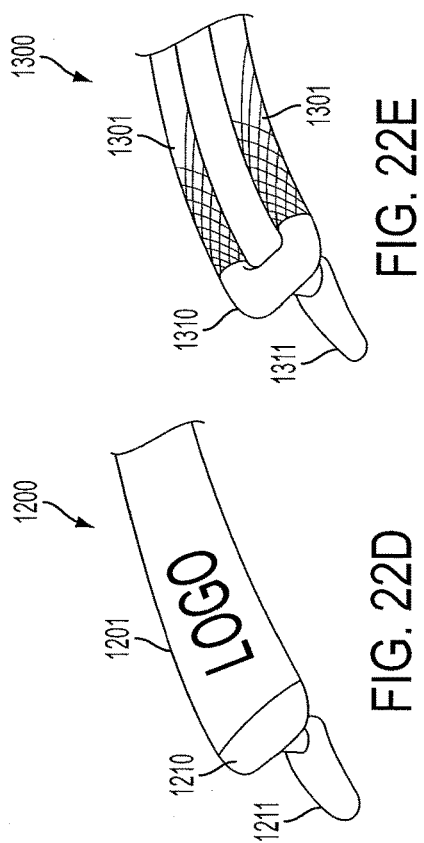

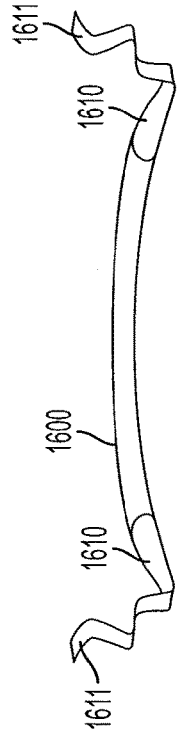
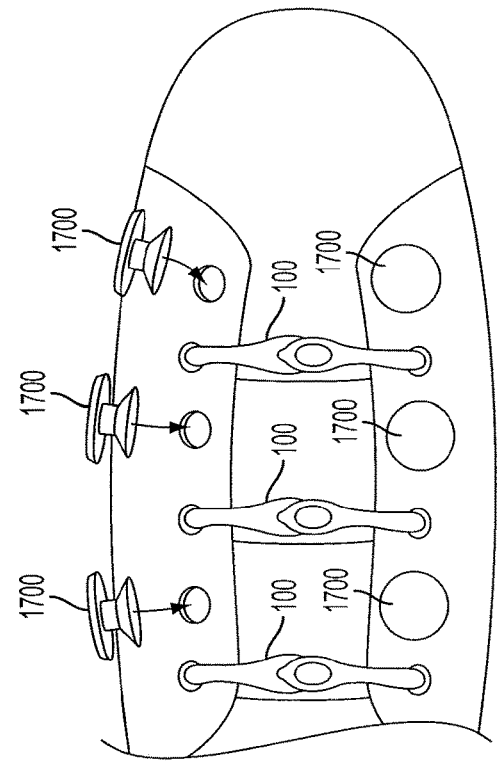
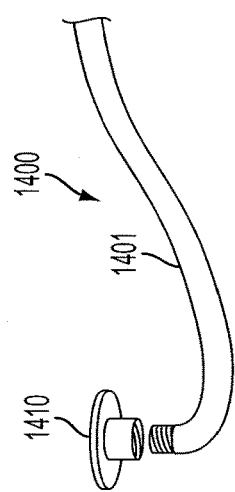
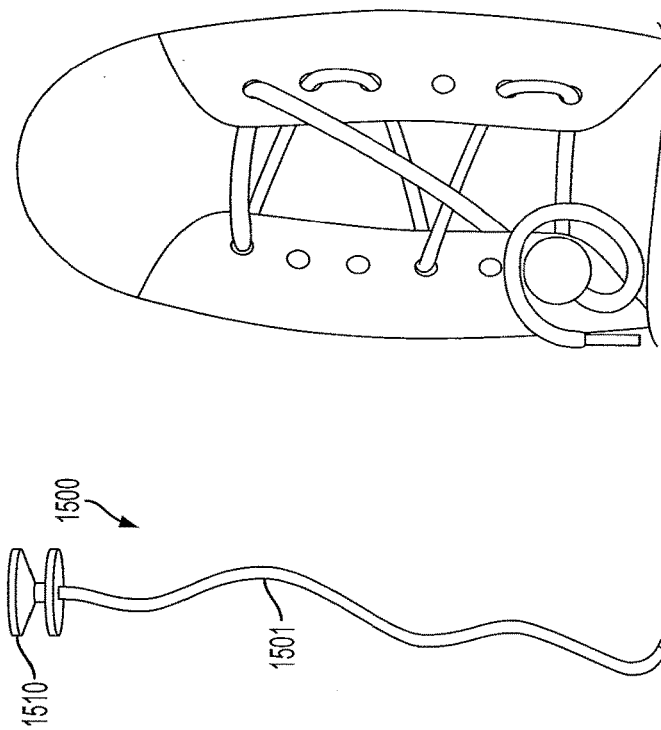
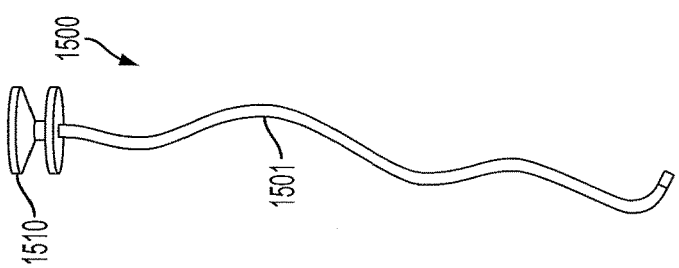

FASTENING DEVICES AND SYSTEMS AND METHODS THEREOF

CROSS REFERENCE TO RELATED APPLICATIONS

This application is a U.S. National Stage of International Application No. PCT/US2012/041713, filed Jun. 8, 2012, which claims priority to U.S. application Ser. No. 13/367,362, filed Feb. 6, 2012, the disclosures of which are hereby incorporated herein by reference in their entirety.

SUMMARY

Embodiments of the present invention can include a flexible fastening device for fastening a first hole, eyelet, loop, or hook on an article of footwear or apparel and a second hole, eyelet, loop, or hook on the article of footwear or apparel, the fastening device having a body comprising: first means for coupling, said first means for coupling including a first end portion; second means for coupling, said second means for coupling including a second end portion; and adjoining means for adjoining said first and second means for coupling, said adjoining means including a body portion between said first end portion and said second end portion. The body portion can be flexible and configured and operative to flex such that said first and second end portions can be removably coupled together or such that said first end portion can be removably coupled to the first hole, eyelet, loop, or hook on an article of footwear or apparel and said second end portion can be removably coupled to the second hole, eyelet, loop, or hook on the article of footwear or apparel.

Embodiments of the present invention also include a flexible fastening device for fastening a first hole, eyelet, loop, or hook on an article of footwear or apparel and a second hole, eyelet, loop, or hook on the article of footwear or apparel. The fastening device can have a body comprising: a first end portion; a second end portion; and a body portion between said first end portion and said second end portion. The body portion is flexible and is configured and operative to flex such that said first and second end portions can be removably coupled together or such that said first end portion can be removably coupled to the first hole, eyelet, loop, or hook on an article of footwear or apparel and said second end portion can be removably coupled to the second hole, eyelet, loop, or hook on the article of footwear or apparel.

Disclosed embodiments include a one-piece flexible device comprising: a first end portion defining a ring and having a single, flexible elongate digit as an extremity of the device; and a second end portion coupled to said first end portion and having a wall having a projection extending therefrom and defining a first opening which provides access to a channel surrounded by said second end portion. The inside of the ring of the first end portion is sized to fit around the projection, and the first opening and the channel are sized such that the digit fits therethrough and therein, respectively, with a base of the digit arranged adjacent to the first opening.

Optionally, the channel is a dead end channel having an end thereof formed by said second end portion. Alternatively, the second end portion can further include a second opening on a side of said device opposite a side of said device associated with the wall and the projection, and the second opening can provide access to the channel. Optionally, the digit does not project from a plane defining the second opening when the body of the digit is inside the channel and the base of the digit is arranged adjacent to the first opening. Alternatively, the digit projects from a plane defining the second opening when the body of the digit is inside the channel and the base of the digit is arranged adjacent to the first opening.

The second end portion may be coupled to the first end portion via an elongate body portion. Optionally, the elongate body portion can have tapered ends or threads at respective interfaces with said first and second end portions. Optionally, the elongate body can have a groove or grooves arranged thereon, for instance longitudinally.

Optionally, a portion of the wall may define a flange around some or all of the projection in plan view, wherein the projection can include a sidewall having a groove extending partially or completely therearound, the groove being sized to receive a corresponding portion of the inside of the ring. The projection in plan view may be one of oval, circular, rectangular, or square, and the inside of the ring in plan view may be one of circular, oval, rectangular, or square. Optionally, the plan view shape of the projection matches the plan view shape of the inside of the ring. Alternatively, the plan view shape of the projection does not match the plan view shape of the inside of the ring.

The device may be used as a fastener for footwear, apparel, luggage, or a bag, for instance, when said first and second end portions are coupled together, or as a piece of jewelry when either said first and second end portions are coupled together or one of said first end portion or said second end portion of said device is coupled to the other of a second end portion or a first end portion of another of said devices.

Embodiments of the present invention also include a fastening device for fastening a first hole, eyelet, loop, or hook on an article of footwear or apparel and a second hole, eyelet, loop, or hook on the article of footwear or apparel, the fastening device having a one-piece elastic body comprising: an anchor portion having a first face and a second face opposite to the first face; the first face having an upstanding wall having a first aperture providing access to a tunnel and a generally cylindrical shaped anchor projecting upward therefrom and a flange around the base of said anchor, said anchor having a continuous groove around its sidewall and a domed top; the second face being substantially smooth; a ring portion having a first face and a second face opposite to the first face; said ring portion forming a ring with its hollow portion oriented such that an axis passing through a center of the hollow portion is perpendicular to a longitudinal axis of the one-piece elastic body, said ring portion having an elongate projection with a rounded tip projecting from a side thereof in the direction of the longitudinal axis; and an elongate body portion between said anchor portion and said ring portion, said body portion having end portions that taper in both side and top views, said body portion having a longitudinal groove running along a portion of its length and a second aperture providing access to the tunnel. The first face of the ring portion and the first face of the anchor portion are on a first side of the one-piece elastic body, and the second face of the ring portion and the second face of the anchor portion are on a second side of the one-piece elastic body. The side of said ring portion from which the elongate projection extends is 180 degrees offset from the juncture where said ring portion and said elongate body meet. The ring portion and the anchor portion are sized to be arranged as follows when said ring portion and said anchor portion are properly coupled: the ring of said ring portion is elastically fits around the groove of the anchor such that the hollow portion is taken up by the anchor, and on the side of the second face of said ring portion, the ring rests on the flange; and the elongate projection with a rounded tip is inside the tunnel, extending through the first aperture, while being visible through the second aperture in a bottom view of the one-piece elastic body. Optionally, the elongate projection may project from a plane defining the second aperture. Alternatively, the elongate projection may not project from the plane defining the second aperture.

The fastening device may be one such device of a set, a kit, or a system. Optionally, the set/kit/system can include two or more, three or more, four or more, etc. number of fastening devices. Optionally, the devices may be of the same configuration and/or size or some or all of the devices may be of different configurations and sizes. For instance, optionally, the set of said fastening devices can include fastening devices each with different overall lengths. Alternatively, the set of said fastening devices can include fastening devices each with a same overall length. As yet another alternative, the set of said fastening devices can include at least two of said fastening devices having different overall lengths.

Optionally, the generally cylindrical shaped anchor may be oval shaped in plan view, and the flange may completely surround the base of said anchor. The ring portion and the anchor portion may be releasably coupled.

Disclosed embodiments also include a fastening method comprising: providing an elastic device for fastening, the elastic device including: a first portion defining a ring and having a flexible elongate projection as an extremity of the device; and a second portion coupled to said first portion and having a wall with a protrusion extending therefrom and defining a first opening which provides access to a tunnel formed by said second portion; and arranging said device by coupling together said first portion and said second portion. Said arranging includes placement of the ring of the first portion around the protrusion of the second portion such that the interior of the ring surrounds the protrusion and such that the flexible elongate projection of the first portion fits inside the tunnel via the first opening.

The method can also comprise, before said arranging step, inserting the elastic device into a pair of holes, eyelets, loops, or hooks of an item. The item may be one of apparel, footwear, luggage, a backpack, a bag, a purse, a boxing glove, a punching bag, and football or lacrosse shoulder pads.

In embodiments, optionally, the protrusion of the second portion may include on its upper face a removable and replaceable portion, the removable and replaceable portion being removable and replaceable to change a color configuration of the device and/or to change a logo or other indicia on the upper face of the protrusion. The upper face of the protrusion can be visible and not concealed when the first and second portions are coupled together. Optionally, in embodiments, a portion of device(s) as shown and described herein may include a portion that is phosphorescent and/or a portion that flashes.

Optionally, in embodiments, the elastic device, the one-piece flexible device, and the fastening device for fastening a first hole, eyelet, loop, or hook on an article of footwear or apparel and a second hole, eyelet, loop, or hook on the article of footwear or apparel can include a portion that is phosphorescent and/or a portion that flashes.

The elastic device, the one-piece flexible device, and the fastening device for fastening a first hole, eyelet, loop, or hook on an article of footwear or apparel and a second hole, eyelet, loop, or hook on the article of footwear or apparel may be made by molding, for instance injection molding. As an example, the anchor portion or the like may be injection molded in a first step, and the remainder of the device may be injection molded around the anchor portion in another step. Alternatively, the entire device may be created in one injection molding step.

Embodiments of the disclosed invention also include apparel, footwear, bags, luggage, backpacks, purses, boxing gloves, punching bags, and shoulder pads that implement fastening devices and systems and methods thereof according to the present invention.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

FIG. 17A shows a top view of a fastening device according to yet another embodiment of the present invention.

FIG. 17B shows a portion of the fastening device shown in FIG. 17A.

FIGS. 18-20 show top views of fastening devices according to additional embodiments of the present invention.

FIGS. 21A-C show views of portions of an adjustable fastening device according to embodiments of the present invention.

FIGS. 22A-E show views of portions of fastening devices according to additional embodiments of the present invention.

FIG. 23 is a partial view of a piece of footwear having a plurality of fastening devices according to FIG. 22E.

FIG. 24A shows an alternative fastening device embodiment according to the present invention.

FIG. 24B shows yet another alternative fastening device embodiment according to the present invention.

FIG. 24C is a partial view of a piece of footwear implementing the fastening device of FIG. 24B.

FIG. 25 is yet another embodiment of a fastening device according to the present invention.

FIG. 26 shows a system comprised of fastening devices and ornamental pieces arranged in a piece of footwear according to an embodiment of the present invention.

DESCRIPTION

Figure 1:
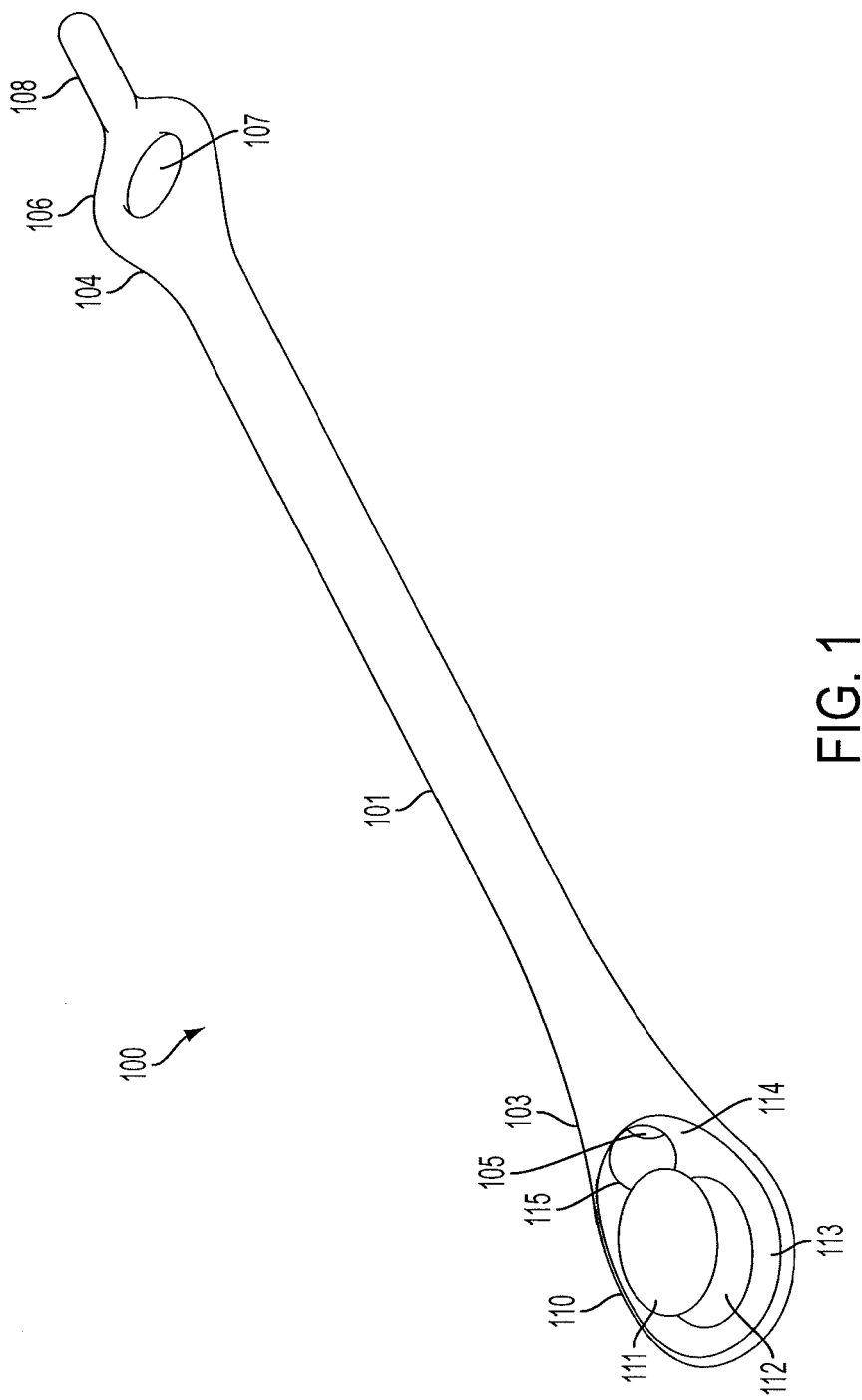
FIG. 1 is a front perspective view of a device according to embodiments of the invention.
Figure 2:
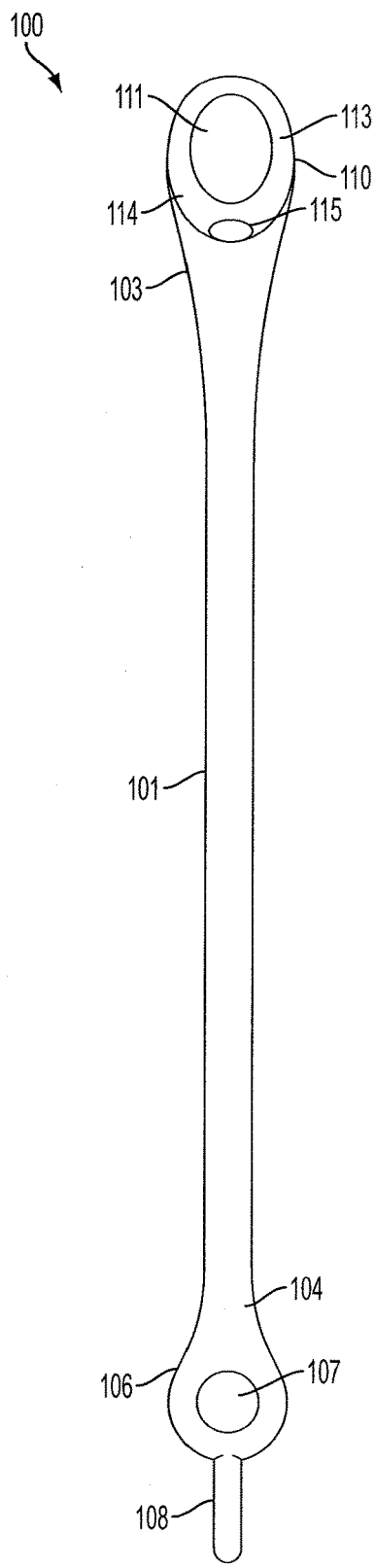
FIG. 2 is a top view of the device shown in FIG. 1.

The description set forth below in connection with the appended drawings is intended as a description of various embodiments of the disclosed subject matter and is not intended to represent the only embodiments in which the disclosed subject matter may be practiced. The description includes specific details for the purpose of providing a thorough understanding of the disclosed subject matter. However, it will be apparent to those skilled in the art that the disclosed subject matter may be practiced without these specific details. In some instances, well-known structures and components may be shown in block diagram form in order to avoid obscuring the concepts of the disclosed subject matter.

Generally speaking, embodiments of the present invention relate to fastening or closure devices and systems and methods thereof. In particular, embodiments of the present invention can include a fastening device or a plurality of fastening devices. In embodiments, each fastening device may have a body (e.g., a one-piece or unitary body) with opposing ends that are configured and operative to be coupled together or to be coupled to their respective complement in another of said fastening devices. In alternative embodiments, the ends may not be configured and operative to be coupled together.

Systems according to embodiments of the disclosed invention can be comprised of a plurality of fastening devices of same or differing configurations and/or one or more ornamental pieces. See, for example, FIG. 26. Incidentally, in embodiments, a portion or portions of the device may be separable or removable from the body, for instance, for replacement thereof.

Fastening devices according to embodiments of the present invention may be used as fasteners or closures for items configured for lacing, for instance, including apparel, footwear, bags, luggage, backpacks, purses, boxing gloves, punching bags, shoulder pads, or the like. Fastening devices and systems according to embodiments of the present invention can be used to replace completely or partially the use of laces for particular items. Devices according to embodiments of the present invention also may have ends thereof fastened together to form a piece of jewelry, such as a bracelet, belt, necklace, or the like, or to simply make a relatively longer fastening device wherein free ends of the furthest apart devices in end-to-end configuration are coupled together.

Furthermore, embodiments of the present invention may provide a means by which to fasten, close, or secure an article of footwear for user wear to thereby replace completely or partially laces. Such partial or full replacement of laces can provide a safer means by which to fasten or otherwise close the footwear when worn by a user. Embodiments of the present invention also may allow a user to customize and decorate the look and layout of his or her footwear or other article/item as set forth herein.

Referring now to FIGS. 1-7, which show an embodiment of a fastening or closure device 100 according to the present invention, the device 100 can have a one-piece or unitary body comprised of a first portion 106 and a second portion 110. Optionally, the device 100 can include an elongate body portion 101. The elongate body portion 101 may have tapered ends at respective interfaces with said first portion 106 and second portion 110. Optionally, the elongate body 101 can have a groove or trench 102 or grooves or trenches arranged thereon, for instance longitudinally as indicated by groove 102. The groove 102 may make body 101 more flexible, for instance, for insertion of the device in and through an eyelet. Further, the groove 102 may assist with compression and elastic expansion in order to avoid crumples and to facilitate threading the frame into the eyelet.

The one-piece body can be flexible and elastic, made out of any suitable material, such as an elastomer (e.g., synthetic rubber) or the like. That is, the body may be bent or otherwise manipulated to take a particular form or shape, for instance, to position, insert, or otherwise affix or arrange the device to an item or article as set forth herein. See, for example, FIGS. 8-15B, 16B, 16C, 16D, 17B, 23, and 26. Portions of the body, during placement, positioning, arranging, and/or affixing of the device on or to an item or article, and/or during use or wear of the item or article, may stretch or be caused to stretch. Thus, the body may be caused to expand or contract when different forces are experienced. Upon removal of the device from the item or article, the device may return to its original form (e.g., non-stretched, uncompressed, and optionally non-bent form) or substantially original form.

The first portion 106 can form or define a ring or annular part with a hollow portion 107 and may be at an end 104 of portion 101 (or in embodiments portion 104 may be considered part of first portion 106). The inside of the ring in plan view may be one of circular, oval, rectangular, or square. Further, in embodiments, the ring may be reinforced with respect to other portions of the body, for instance based on its thickness, its composition, or a hardened material embedded therein, such as a plastic or metallic ring or semi-ring. Such reinforcement or otherwise constitution of the ring can increase resistance to tearing, for instance.

First portion 106 can also include a single, flexible elongate digit or protrusion 108 as an extremity of the device 100. Alternatively, the elongate digit or protrusion 108 may be relatively rigid, as compared to the first portion 106. Optionally, the tip of the protrusion 108 may be rounded or pointed. The protrusion 108 may extend from the ring at an angle 180 degrees from the juncture at which the ring meets portion 104 of the device 100. In its original or as-formed form (e.g., non-twisted, unbent form), the ring may have its hollow portion 107 oriented such that an axis passing through the center of the hollow portion 107 is perpendicular to a longitudinal axis of the device 100.

As will be discussed below, protrusion 108 may assist with insertion of the device 100 through an eyelet for instance—a needle tip if you will. Protrusion 108 also may assist with maintaining retention of the first portion 106 and the second portion 110 together.

Second portion 110 may be at an end 103 of portion 101 (or in embodiments portion 103 may be considered part of second portion 110). Second portion 110 can have a first face and a second face opposite to the first face. The first face can have a wall which can have an upstanding portion 114 and an anchor portion 111. The second face may be substantially smooth. Incidentally, the term "anchor" is used to denote that portion 111 can be used for coupling the first portion 106 to the second portion 110 as will be described below in greater detail.

Anchor portion 111 may be defined as a projection or protrusion which extends from the wall. In embodiments, anchor portion 111 may be reinforced with respect to other portions of the body, for instance based on its thickness, its composition, a hardened material embedded therein, such as a plastic or metallic plug, and/or its structural configuration. Such reinforcement may assist with retention of the ring of the first portion 106 around the anchor portion 111. Alternatively, anchor portion 111 may be made of a different material—harder or more rigid, for instance—than surrounding portions, such as end 103, flange 113, and wall portion 114. For example, anchor portion 111 may be made of a plastic, whereas surrounding portions may be made of a more flexible elastomer. As with the case of a reinforced anchor portion 111, a harder, more rigid anchor portion 111 may assist with retention of the ring of the first portion 106 around the anchor portion 111. That is, a more stable and reliable anchor structure may be provided for the first portion 106 to be coupled to.

Anchor portion 111 may have any suitable configuration, such as generally cylindrical. The anchor portion 111 in plan view may be one of oval, circular, rectangular, or square. Optionally, the plan view shape of the anchor portion 111 may be identical to the plan view shape of the inside of the ring. Alternatively, the plan view shape of the anchor portion 111 may not be identical to the plan view shape of the inside of the ring.

Optionally, anchor portion 111 may have a sidewall with a continuous groove 112, for instance. Alternatively, the groove 112 may be discontinuous. Groove 112 may be sized and shaped based on the size and shape of the ring of first portion 106 so that the first portion 106 can be coupled to the anchor portion 111. Alternatively, anchor portion 111 may have in the place of groove 112 a convex portion and a corresponding groove may be formed along the inner wall of the ring of the first portion 106 so these portions of the anchor portion 111 and the first portion 106 fit together nicely. In embodiments, anchor portion 111 can have a mixture of convex and concave (i.e., grooved) portions around its sidewall and the inner portion of the ring of the first portion 106 can have complementary convex and concave portions. Thus, it is apparent that embodiments of the present invention contemplate a number of complementary mating features for the anchor portion 111 and the first portion 106, and the above-indicated configurations are merely non-limiting examples.

Figure 4:
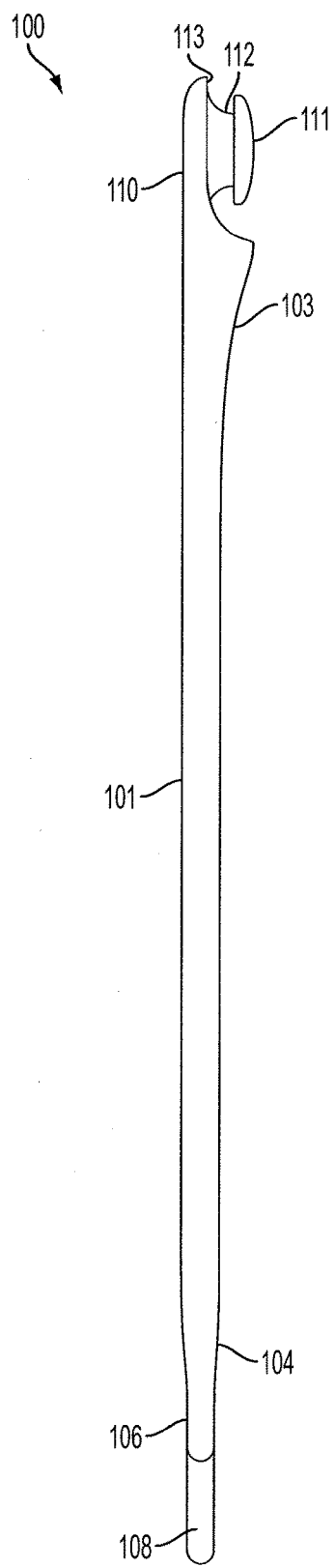
FIG. 4 is a left side view of the device shown in FIG. 1.
Figure 5:
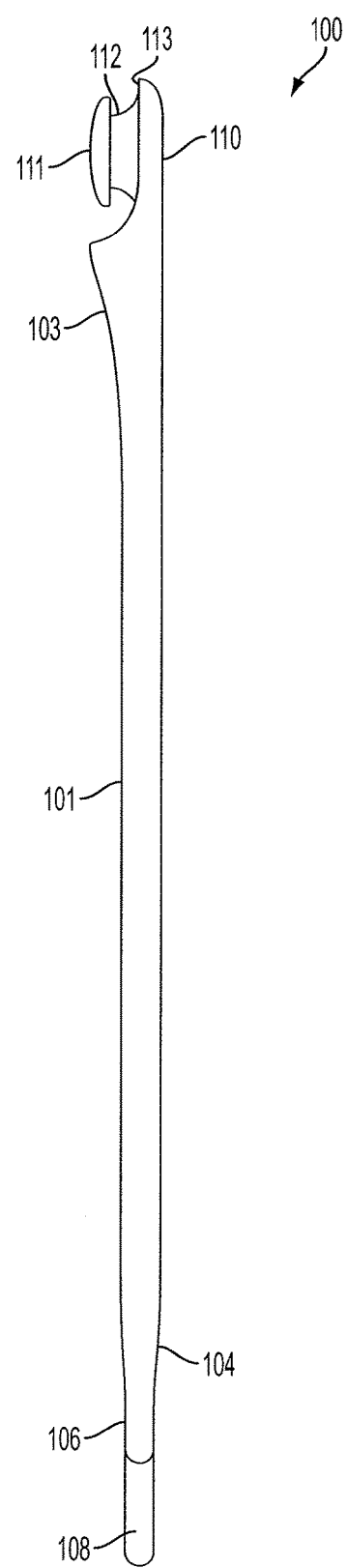
FIG. 5 is a right side view of the device shown in FIG. 1.
Figure 6:
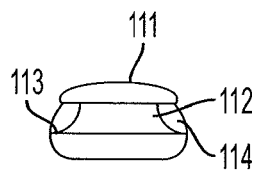
FIG. 6 is a first end view of the device shown in FIG. 1.

Anchor portion 111 may have a top thereof that is flat or domed. Thus, in embodiments, where anchor portion 111 includes a domed top and a continuous groove 112, the anchor portion 111 may be mushroom shaped (e.g., as shown in FIGS. 4-6). The groove 112 can be sized to receive a corresponding portion of the inside of the ring.

In embodiments, optionally, a portion of the wall may form a flange 113 around the base of the anchor portion 111. The flange 113 may completely surround anchor portion 111 in plan view, or it may partially surround anchor portion 111.

Figure 3:
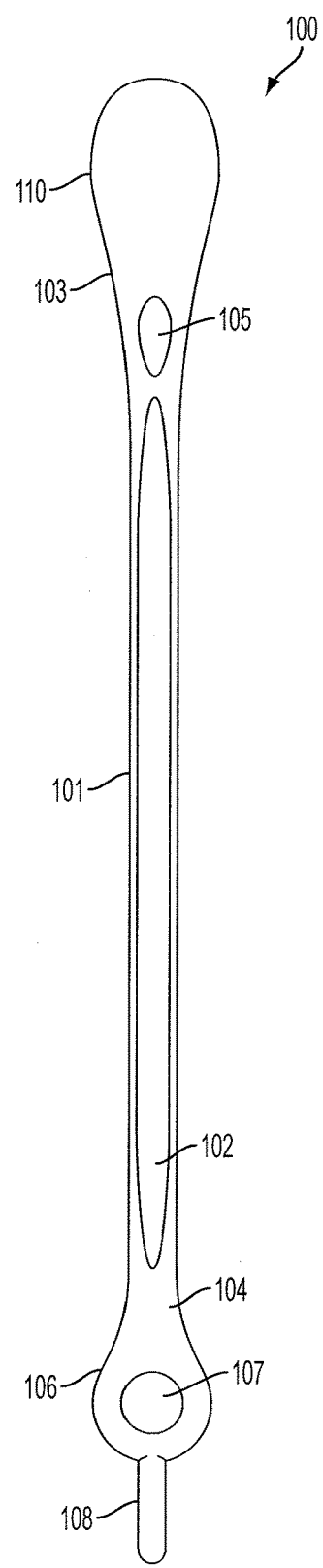
FIG. 3 is a bottom view of the device shown in FIG. 1.

The wall may also have a portion thereof 114 which defines a first opening or aperture 115, which provides access to a tunnel or a channel formed in the second portion 110. Wall portion 114 may rise vertically or alternatively generally upward and away from anchor portion 111 and may be characterized as an upstand or upstanding wall. Optionally, the channel or tunnel may be a dead end tunnel/channel having an end thereof formed by the second portion 110. Alternatively, and as shown in FIG. 3, the second portion 110 can include a second opening 105 on the second side of the device 100 opposite the first side of the device 100 associated with the wall portion 114 and the anchor portion 111. The second opening 105 can provide access to the tunnel or channel. The tunnel or channel can be used as container for the protrusion 108, for instance, to act as a shield or barrier against unwanted or inadvertent external forces attempting to act on the protrusion 108.

FIGS. 8-14 show various views of device 100 with first and second portions 106, 110 properly coupled together. As shown in FIGS. 8-14, the first portion 106 and the second portion 110 are coupled such that the first face of the second portion 110 faces the second face of the first portion 106. Optionally, portions 106, 110 may be rotated with respect to each other such that the first face of the second portion 110 faces the first face of the first portion 106 when portions 106, 110 are properly coupled together.

As shown in FIGS. 8-14, the inside 107 of the ring of the first portion 106 is sized to fit around the anchor portion 111, and the first opening 115 and the channel or tunnel are sized such that the projection 108 fits therethrough and therein, respectively, with a base of the projection 108 arranged adjacent to the first opening 115. More specifically, for coupling the first and second portions 106, 110 together, the ring of the first portion 106 can elastically fit around the groove 112 of the anchor portion 111 such that the hollow portion 107 of the ring is taken up by the body of the anchor portion 111. In the case where flange 113 is implemented, the face of the ring portion 106 may rest on the flange 113.

The extreme-most portion of the projection 108 may be rounded as shown in FIGS. 1-5, or it may form a relatively sharp point. The projection may fit inside of the tunnel or channel via first opening or aperture 115. In embodiments having no second opening or aperture 105, the projection 108 may be completely hidden. In the case of embodiments having optional opening or aperture 105, the projection 108 may be visible through the second opening 105. Optionally, the projection 108 does not project from a plane defining the second aperture when the projection 108 is fully and properly positioned within the tunnel or channel. In embodiments, proper positioning of the projection 108 can mean when the base of the projection 108 is adjacent to the first opening 115. Alternatively, the projection may project from the plane defining the second aperture when the projection 108 is fully and properly positioned within the tunnel or channel.

In embodiments, anchor portion 111 may have on its upper face, which is visible and not concealed when the first and second portions 106, 110 are coupled together, a removable and replaceable portion (not explicitly shown). The removable and replaceable portion may be removable and replaceable to change a color configuration of the device and/or to change a logo or other indicia on the upper face of the protrusion.

Figure 15A:
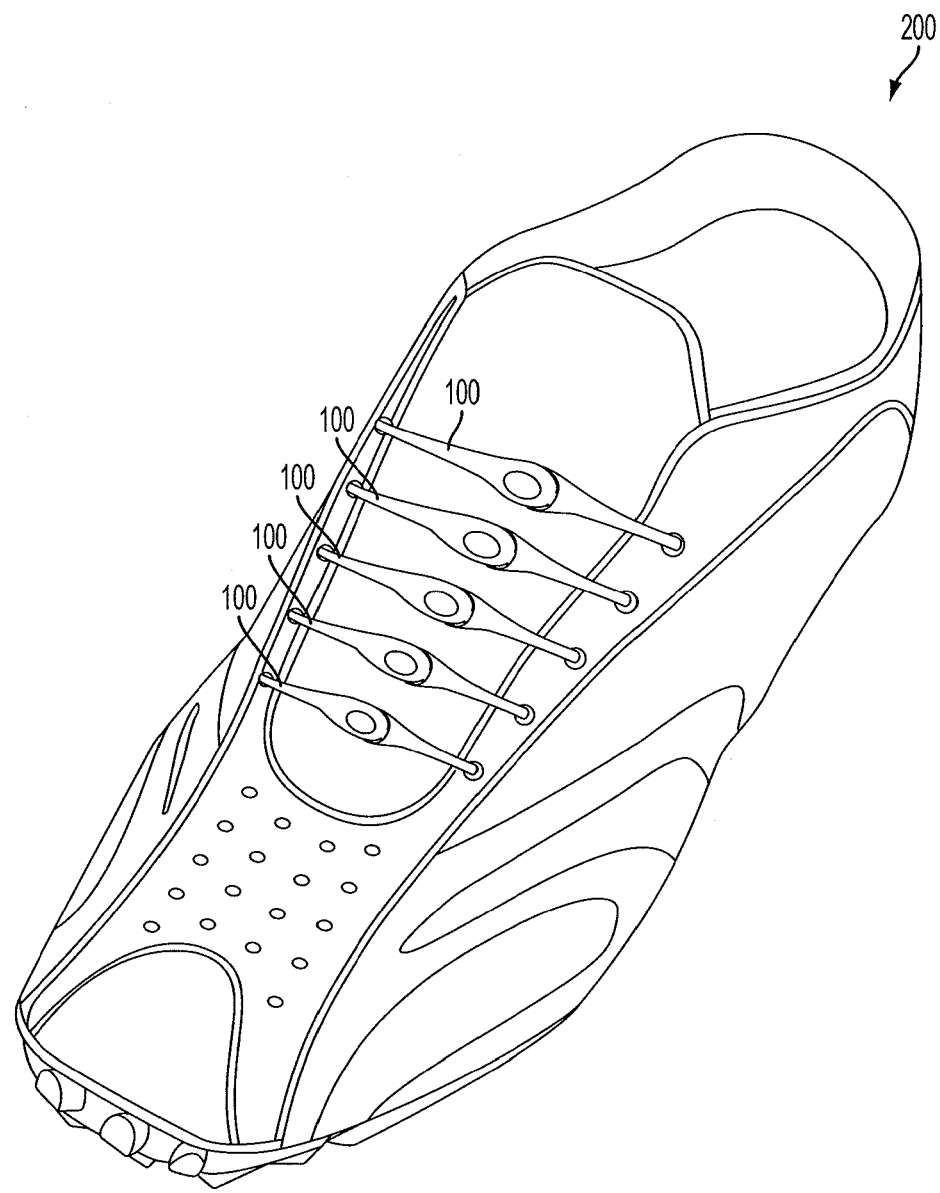
FIG. 15A is a front perspective view of a plurality of fastening devices according to embodiments of the present invention arranged in footwear.
Figure 15B:
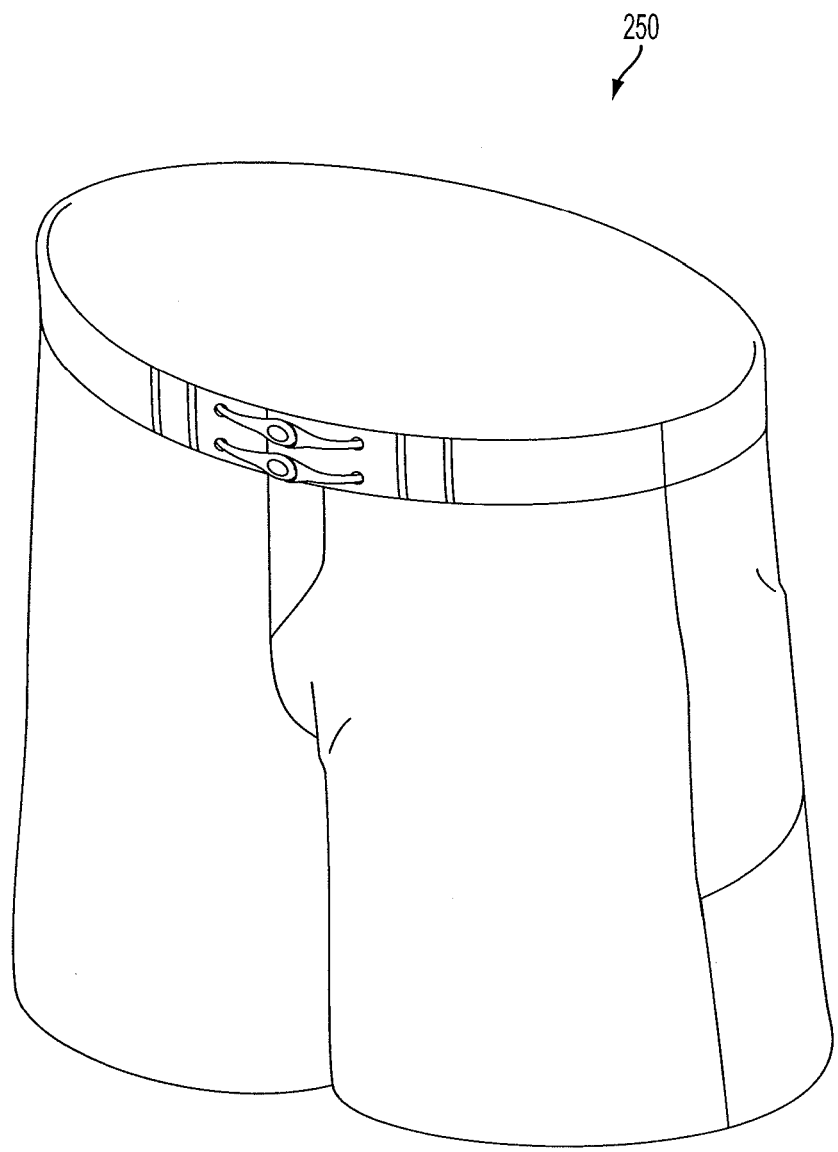
FIG. 15B is a front perspective view of a plurality of fastening devices according to embodiments of the present invention arranged in an article of clothing.

FIG. 15A is a front perspective view of a plurality of fastening devices 100 arranged in footwear 200. The plurality of devices 100 may come as part of a kit or package of devices 100. Optionally, the kit may contain more devices 100 than shown. FIG. 15B is a front perspective view of a plurality of fastening devices 100 arranged in an article of clothing 250. The plurality of devices 100 may come as part of a kit or package of devices 100. Optionally, the kit may contain more devices 100 than shown. As indicated herein, devices according to embodiments of the present invention are not limited to being used with the footwear and shorts shown in FIGS. 15A and 15B.

Figure 16A:
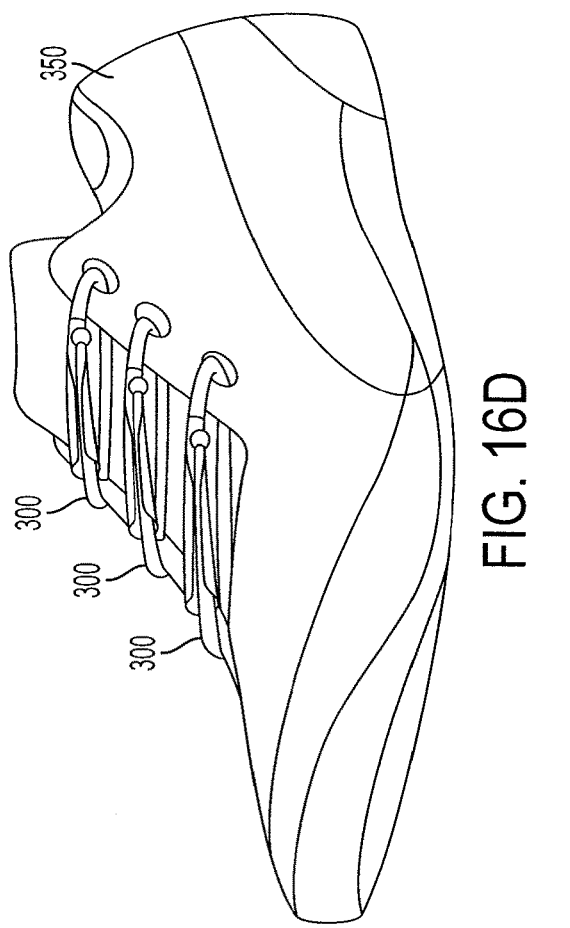
FIG. 16A shows a top view of a fastening device according to another embodiment of the present invention.
Figure 16B:
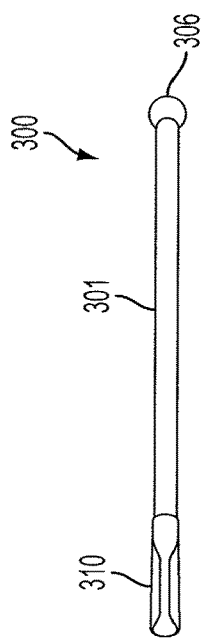
FIG. 16B shows a portion of the fastening device of FIG. 16A.
Figure 16C:
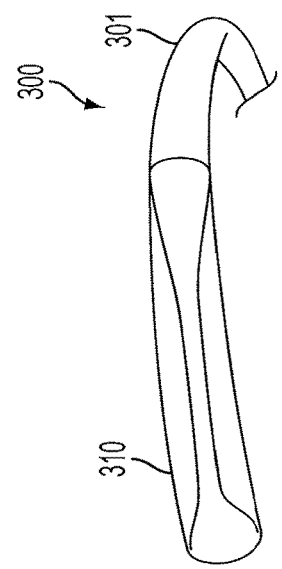
FIG. 16C shows interaction between portions of the fastening device of FIG. 16A.
Figure 16D:
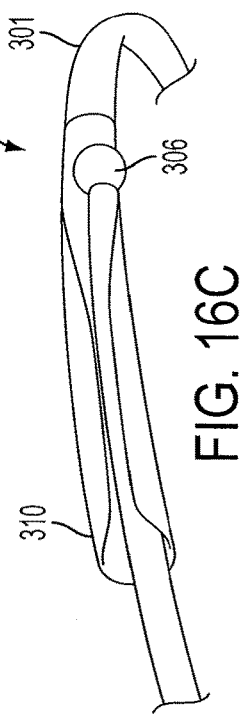
FIG. 16D shows a plurality of fastening devices according to FIGS. 16A through 16C arranged in a piece of footwear.

FIGS. 16A-16C show a fastening device 300 according to another embodiment of the present invention. FIG. 16D shows a plurality of fastening devices 300 according to FIGS. 16A through 16C arranged in an article of footwear 350.

Device 300 has a first end portion 306, a second end portion 310, and a body portion 301 between the first and second end portions 306, 310. The body portion 301 may be flexible so as to bend in order to allow the first end portion 306 to be positioned relative to the second end portion 310, for instance as shown in FIGS. 16C and 16D, with part of the body portion 301 residing within an inner or inside portion of second end portion 310. Body portion 301 may, in its natural form, be non-arcuate. Alternatively, in its natural form, the body portion 301 may be curved or arcuate. The arcuate orientation of the body portion 301 may be such that it suggests the direction in which to manipulate the first end portion 306 relative to the second end portion 310 in order to properly couple the end portions together, such as shown in FIG. 16D.

Furthermore, second end portion 310 may be configured and operative as an anchor portion so to speak to prevent the first end portion 306 from moving at all or optionally to a degree whereby the first end portion 306 and second end portion 310 would be no longer coupled together. Thus, in embodiments, second end portion 310 may allow the body portion 301 and first end portion 306 to move relative to it, or vice versa without the ends coming uncoupled.

The second end portion 310 may be configured with an open end portion 311 and a curved sidewall having opposing ends 312, 313 that define an access 314 to the inside portion formed by the curved sidewall. Access 314 may have a narrowest part that tapers or widens at one or both ends thereof. FIGS. 16A-16D, for example, show access 314 tapering at opposite ends. Access 314 provides a means by which to couple (and decouple) the first end portion 306 to the second end portion 310. More specifically, first end portion 306 may be arranged relative to the second end portion 310 in overlapping fashion as implied by FIG. 16C such that the body portion 301 is adjacent access 314 and such that the first end portion 306, in this embodiment the ball-shaped portion, extends past the access 314. Body portion 301, which may be slightly larger than access 314, can be arranged within the inside portion formed by the curved sidewall via access 314 as shown in FIG. 16C. Opposing ends 312, 313 may be caused to deform slightly as the body portion 301 is arranged within the inside portion. In embodiments, access 314 does not allow radial inward or outward access to and from the inside portion by the first end portion 306.

The first end portion 306 may be configured as a ball or some other bulbous or enlarged formation with respect to body portion 301 attached to or formed in one piece with the body portion 301. First end portion 306 can be sized to fit into the inside portion of the second end portion 310. In embodiments, the first end portion 306 may be held in place at a location about the inside portion. Optionally, second end portion 310 may allow the body portion 301 and first end portion 306 to move relative to it, or vice versa, without the ends coming uncoupled.

FIG. 17A shows a top view of a fastening device 400 according to yet another embodiment of the present invention. FIG. 17B shows a portion of the fastening device 400 shown in FIG. 17A.

Device 400 can have a one-piece or unitary body comprised of a first portion 406 and a second portion 410. Optionally, the device 400 can include an elongate body portion 401. Generally speaking, the body portion 401 can be flexible so as to bend in order to allow the first end portion 406 to be coupled to the second end portion 410.

Optionally, the elongate body 401 can have a groove or trench or grooves or trenches arranged thereon (not shown), for instance longitudinally. Such a groove or grooves may make body 401 more flexible, for instance, for insertion of the device in and through an eyelet. Further, such groove or grooves may assist with compression and elastic expansion in order to avoid crumples and to facilitate threading the frame into the eyelet.

The one-piece body can be flexible and elastic, made out of any suitable material, such as an elastomer (e.g., synthetic rubber) or the like. That is, the body may be bent or otherwise manipulated to take a particular form or shape, for instance, to position, insert, or otherwise affix or arrange the device to an item or article as set forth herein. Portions of the body, during placement, positioning, arranging, and/or affixing of the device 400 on or to an item or article, and/or during use or wear of the item or article, may stretch or be caused to stretch. Thus, the body may be caused to expand or contract when different forces are experienced. Upon removal of the device 400 from the item or article, the device 400 may return to its original form (e.g., non-stretched, uncompressed, and optionally non-bent form) or substantially original form.

In embodiments, one or both of the end portions 406, 410 may be separately made pieces that are fixedly coupled to the body portion 401. For instance, second end portion 410 may be a separate piece that is coupled to body portion 401. In embodiments, second end portion 410 may be made from a different material, plastic for instance, than the material from which body portion 401 and/or first end portion 406 are made (e.g., the flexible and elastic material mentioned above).

The first portion 406 can form or define a ring or annular part with a hollow portion 407. The inside of the ring in plan view may be one of circular, oval, rectangular, or square. Further, in embodiments, the ring may be reinforced with respect to other portions of the body, for instance based on its thickness, its composition, or a hardened material embedded therein, such as a plastic or metallic ring or semi-ring. Such reinforcement or otherwise constitution of the ring can increase resistance to tearing, for instance.

Second portion 410 can include an anchor portion 411. As with previous embodiments, the term "anchor" is used to denote that portion 411 can be used for coupling the first portion 406 to the second portion 410.

Anchor portion 411 may be defined as a projection or protrusion which extends from a base of the second portion 410. In embodiments, anchor portion 411 may be reinforced with respect to other portions of the body, for instance based on its thickness, its composition, a hardened material embedded therein, such as a plastic or metallic plug, and/or its structural configuration. Such reinforcement may assist with retention of the ring of the first portion 406 around the anchor portion 411. Alternatively, anchor portion 411 may be made of a different material—harder or more rigid, for instance—than surrounding portions. For example, anchor portion 411 may be made of a plastic, whereas other portions of device 400 may be made of a more flexible elastomer. As with the case of a reinforced anchor portion 411, a harder, more rigid anchor portion 411 may assist with retention of the ring of the first portion 406 around the anchor portion 411. That is, a more stable and reliable anchor structure may be provided for the first portion 406 to be coupled to.

Anchor portion 411 may have any suitable configuration, such as generally cylindrical. The anchor portion 411 in plan view may be one of oval, circular, rectangular, or square. Optionally, the plan view shape of the anchor portion 411 may be identical to the plan view shape of the inside of the ring. Alternatively, the plan view shape of the anchor portion 411 may not be identical the plan view shape of the inside of the ring.

Optionally, anchor portion 411 may have a sidewall with a continuous groove 412, for instance. Alternatively, the groove 412 may be discontinuous. Groove 412 may be sized and shaped based on the size and shape of the ring of first portion 406 so that the first portion 406 can be coupled to the anchor portion 411. The groove 412 can be sized to receive a corresponding portion of the inside of the ring. Alternatively, anchor portion 411 may have in the place of groove 412 a convex portion and a corresponding groove may be formed along the inner wall of the ring of the first portion 406 so these portions of the anchor portion 411 and the first portion 406 fit together. In embodiments, anchor portion 411 can have a mixture of convex and concave (i.e., grooved) portions around its sidewall and the inner portion of the ring of the first portion 406 can have complementary convex and concave portions. Thus, it is apparent that embodiments of the present invention contemplate a number of complementary mating features for the anchor portion 411 and the ring of first portion 406. Accordingly, the above-indicated configurations are meant as non-limiting examples.

Anchor portion 411 may have a top portion 413 thereof that is flat, domed, concave, or which defines an opening. In embodiments, anchor portion 411 may have on its upper face a removable and replaceable portion. For instance, top portion 413 may be removable and replaceable to change a color configuration of the device and/or to change a logo or other indicia on the upper face of the protrusion. Optionally, top portion 413 may be used as a base to attach charms or the like, for instance.

Regarding coupling of the first end portion 406 to the second end portion 410, the inside 407 of the ring of the first portion 406 is sized to fit around the anchor portion 411. More specifically, for coupling the first and second portions 406, 410 together, the ring of the first portion 406 can elastically fit around the groove 412 of the anchor portion 411 such that the hollow portion 407 of the ring is taken up by the body of the anchor portion 411.

FIGS. 18-20 show top views of fastening devices 500, 600, 700 according to additional embodiments of the present invention.

Devices 500, 600, 700 can have a one-piece or unitary body comprised of respective first portions 506, 606, 706 and second portions 510, 610, 710. Optionally, the devices can include an elongate body portion 501, 601, 701. Generally speaking, the body portions 501, 601, 701 can be flexible so as to bend in order to allow respective first end portions 506, 606, 706 to be coupled to corresponding second end portions 510, 610, 710. Optionally, in embodiments, such as device 500 in FIG. 18 and device 600 in FIG. 19, the body portion may be bifurcated with a hollow or void 502, 602 between the two fractions.

Optionally, the elongate bodies 501, 601, 701 can have a groove or trench or grooves or trenches arranged thereon (not shown), for instance longitudinally. Such a groove or grooves may make the bodies more flexible, for instance. Further, such groove or grooves may assist with compression and elastic expansion in order to avoid crumples and to facilitate threading.

The one-piece body can be flexible and elastic, made out of any suitable material, such as an elastomer (e.g., synthetic rubber) or the like. That is, the body may be bent or otherwise manipulated to take a particular form or shape, for instance, to position, insert, or otherwise affix or arrange the device to an item or article as set forth herein. Portions of the body, during placement, positioning, arranging, and/or affixing of the devices 500, 600, 700 on or to an item or article, and/or during use or wear of the item or article, may stretch or be caused to stretch. Thus, the body may be caused to expand or contract when different forces are experienced. Upon removal of the device 500/600/700 from the item or article, the device 500/600/700 may return to its original form (e.g., non-stretched, uncompressed, and optionally non-bent form) or substantially original form.

In embodiments, one or both of the end portions 506/606/706 and 510/610/710 may be separately made pieces that are fixedly coupled to the corresponding body portion 501/601/701. For instance, second end portion 510, 610, 710 may be a separate piece that is coupled to body portion 501, 601, 701. In embodiments, the second end portion may be made from a different material, plastic for instance, than the material from which body portion and/or first end portion are made (e.g., the flexible and elastic material mentioned above).

In FIGS. 18 and 19, each of the devices 500, 600 has a first end portion 506, 606 with an extremity 507, 607 thereof that can be used to assist with insertion of the device through an eyelet, for instance, and for grasping by the wearer to assist with coupling the first end portion to the second end portion. In devices 500, 600, second end portions 510, 610 have a Y-shaped channel 512, 612 formed in-part by a projecting part 511, 611 at the fork or part at which the channel branches into two paths. The shape and configuration of the channel 512, 612 and the projecting part 511, 611 is complementary with the configuration of the juncture 508, 608 at which the first end portion 506, 606 meets the body portion 501, 601 and the size and shape of the first end portion 506, 606. Further, the extremity 507, 607 of the first end portion 506, 606 is sized and shaped so as to securely and frictionally fit within the base portion of the Y-shaped channel. Thus, when the first end portion 506, 606 and the second end portion 510, 610 are properly coupled together, first end portion 506, 606 are arranged inside trench 512, 612 such that the juncture 508, 608 is at the fork or part at which the channel 512, 612 branches into two paths with the extremity 507, 607 facing inwardly, toward body portion 501, 601. Optionally, extremity 507, 607 may overlap hollow or void 502, 602 in plan view when the first and second end portions are properly coupled together. Put another way, extremity 507, 607 may project into hollow or void 502, 602 when the first and second end portions are properly coupled together.

Device 700 shown in FIG. 20 expresses a variation in the coupling concept shown and described with respect to devices 500 and 600 in FIGS. 18 and 19, respectively.

First end portion 706 of device 700 includes a hollow or void portion 707 (e.g., similar to the ring of previously discussed embodiments). Second end portion 710 includes an anchor portion 711 having a projection 712. The projection and the hollow portion 707 can be sized and shaped to be coupled together. For instance, hollow portion 707 can fit around projection 712 when the two end portions 706, 710 are properly coupled together.

FIGS. 21A-C show views of portions of an adjustable fastening device 800 according to embodiments of the present invention.

Generally speaking, fastening device 800 can be adjustable to provide a tighter (or looser) fit and/or based on a size or distance of an article or item to which it is attached. For example, the device 800 can be adjusted to make its length longer for arrangement in two eyelets of an adults shoe as compared to its length for arrangement in two eyelets in a child or teenager's shoe. As another example, the device 800 can be adjusted based on whether the device 800 is oriented horizontally, from one eyelet to another eyelet at the one eyelet's level, or non-horizontally, either diagonally or vertically, from one eyelet to another eyelet below or above the one eyelet, whether in its same column or the opposing column of eyelets.

Fastening device 800 can have a body portion 801 and an end portion 810. Movably coupled to end portion 810 can be a movable bracket 820 that is movable along the axis of the body portion 801. Bracket 820 can have a governor 825 with a downward facing notch that can be positioned into trenches 826 to hold the bracket 820 in place at a desired position. Bracket 811 can also have coupled to a bottom side thereof an anchor portion 811. Anchor portion 811 may be used as a coupling means to an opposite end of the fastening device (not shown). For example, the opposite end of the fastening device 800 may be configured as with a ring or void such as in the embodiments of FIGS. 1, 17A, and 20. An end portion of anchor portion 811 may be placed into and through the ring or void to couple opposite ends of the device 800 together. Alternatively, device 800 may have ends being identical to the end portion 810 shown in FIGS. 21A-21C. In this case, each of the ends may have their respective anchor portions 811 with end portions thereof inserted into and through corresponding eyelets, for instance, of an item or article, thereby fastening one eyelet to another eyelet via the device 800.

FIGS. 22A-22E show views of portions of fastening devices 900, 1000, 1100, 1200, and 1300 according to additional embodiments of the present invention.

Similar to device 800 indicated above, the devices shown in FIGS. 22A-22E have respective end portions 910, 1010, 1110, 1210, 1310 coupled to corresponding body portions 901, 1001, 1111, 1201, and 1301. Incidentally, body portion 1301 in FIG. 22E is a bifurcated body portion, whereas the other body portions are not bifurcated. Each of the end portions can have attached thereto an anchor portion 911, 1011, 1111, 1211, 1312. Optionally, a spacer 1012, 1112, 1312 may be between the anchor portion and the end portions 1010, 1110, 1210, 1310 as shown in FIGS. 22B-22E. Though not shown in FIG. 22A, a spacer also may be implemented.

Anchor portion 911, 1011, 1111, 1211, 1312 may be used as a coupling means to an opposite end of the fastening device (not shown). For example, the opposite end of the fastening device may be configured as with a ring or void such as in the embodiments of FIGS. 1, 17A, and 20. An end portion of anchor portion 911, 1011, 1111, 1211, 1312 may be placed into and through the ring or void to couple opposite ends of the corresponding device together. FIG. 22B shows an embodiment having optional collars 1020 arranged on body portion 1001. Either of the two embodiments of collars 1020(1) or 1020(2) may be used. Further, collars 1020 may be used with any of the other embodiments as set forth herein, though their configuration may be modified based on the particular body portion around with they are placed or to be placed.

Alternatively, any of the devices in FIGS. 22A-22E may have ends being identical to the end portion 910, 1010, 1110, 1210, 1310 shown in FIGS. 22A-22E. In this case, each of the ends may have their respective anchor portions with end portions thereof inserted into and through corresponding eyelets, for instance, of an item or article, thereby fastening one eyelet to another eyelet via the device. FIG. 23 shows an example of a plurality of devices 1300 from FIG. 22E with their end portions 1310 anchored via anchor portions 1311 in eyelets of an article of footwear. Not expressly shown, the other end portions of the devices 1300 can have their anchor portions anchored in eyelets on the other side of the footwear.

FIG. 24A shows an alternative fastening device 1400 according to embodiments of the present invention. Device 1400 can have an anchor portion 1410 and a flexible body portion 1401. The anchor portion 1410 can be removably coupled to flexible body portion 1401 via threads, for instance, or another suitable coupling mechanism. Optionally, the other end of device 1400 can be identical to the end shown in FIG. 24A. In use, the flexible body portion 1401 may be threaded through eyelets, for instance, in any suitable pattern, such that each end of the flexible body portion 1401 is exposed. Respective anchor portions 1410 may then be removably affixed to the flexible body portion 1401.

FIGS. 24B and 24C show yet another alternative fastening device 1500 according to embodiments of the present invention. FIG. 24C is a partial view of a piece of footwear implementing the fastening device 1500 shown in FIG. 24B. Device 1500 can have an anchor portion 1510 and a flexible body portion 1501. The anchor portion 1510 of device 1500 can have a spool configuration, whereby the flexible body portion 1501 may be wrapped around the anchor portion's central axis, between end portions thereof. As can be seen from FIG. 24C, device 1500 can have an end thereof opposite the end with the anchor portion 1510 "threaded" through a number of eyelets in the footwear, with the base of the anchor portion 1510 arranged adjacent the first eyelet through which said end was threaded, and with a free portion of said end being wrapped around the anchor portion's central axis.

FIG. 25 is yet another embodiment of a fastening device 1600 according to the present invention. Fastening device 1600 can have ends with a foldable portion or multiple threads, whereby the overlapping portion 1611 can be folded over such that its upper face is facing downward and contacts the upper face of overlapped portion 1610. The upper faces of portions 1610 and 1611 can have a means by which to couple to each other, such as a hook a loop fastening system. Fastening device 1600 may be "laced" through one or more eyelets and then overlapping portions 1611 folded over to keep the fastening device 1600 in place.

FIG. 26 shows a system comprised of fastening devices 100 and ornamental pieces 1700 arranged in a piece of footwear according to an embodiment of the present invention. Ornamental pieces 1700 can be in the form of flowers, balls or any kind of figure that users may choose to customize and decorate their footwear. Pieces 1700 may not be solely for ornamental purposes and may provide a bumper so to speak with a height above fastening devices 100 such that they may block unwanted touching of the fastening devices 100 by foreign objects (e.g., a bush's limb may strike piece 1700 rather than device 100 as a jogger jogs with the devices 100 and pieces 1700 in their shoes). Further, not explicitly shown, a body portion may extend from one piece 1700 to another piece 1700. This body portion may be formed in one piece with the pieces 1700 or it may be coupled to each of the pieces to form an integral unit (for example, as shown in FIG. 24A or similar thereto).

A number of fastening devices and fastening systems have been described above and herein. Any of the embodiments may include a portion or portions that are phosphorescent and/or which flash.

Figure 27:
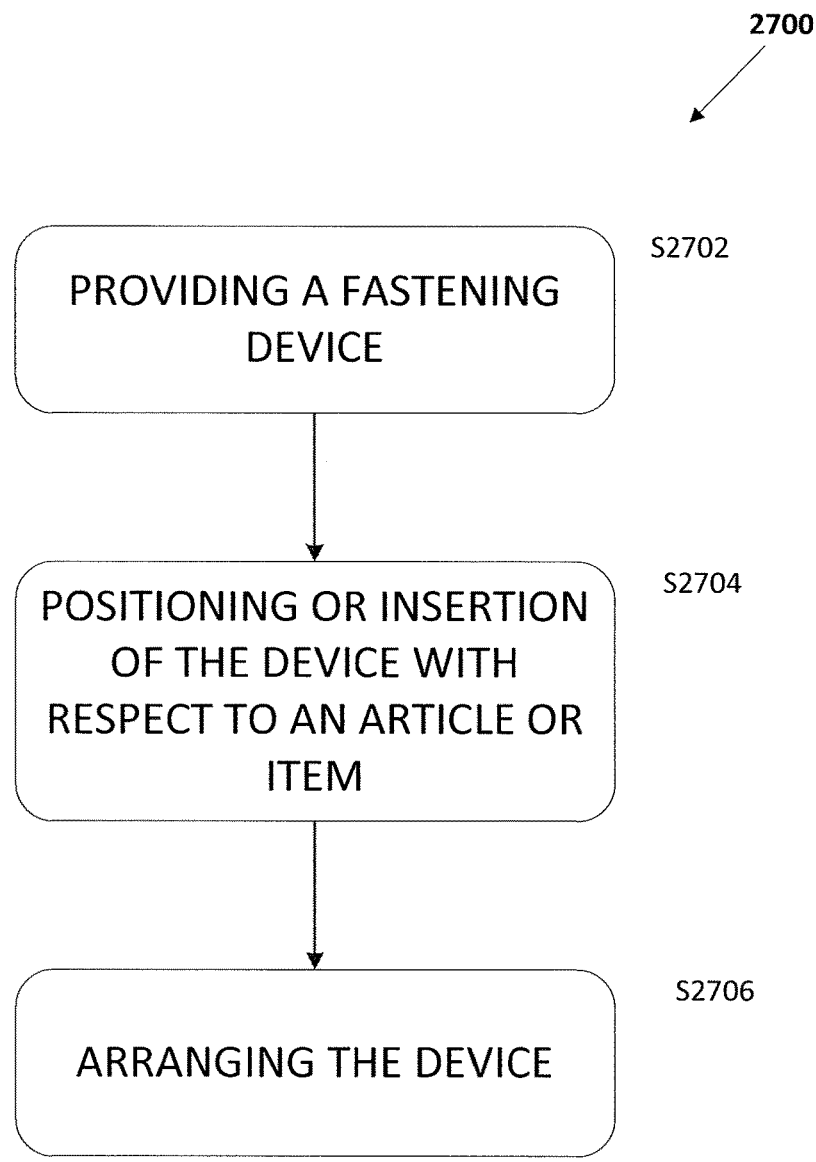
FIG. 27 is a flow chart of a method according to embodiments of the present invention.

FIG. 27 is a flow chart of a method 2800 according to embodiments of the present invention. Method 2800 can be a method for forming a fastening, closing, or securing device and/or a method for fastening, closing, or securing.

Method 2800 can include providing a device or a plurality of devices as shown and described herein (S2802). For example, the device(s) may be an elastic device for fastening, wherein the elastic device can include: a first portion defining a ring and having a flexible elongate projection as an extremity of the device; and a second portion coupled to the first portion and having a wall with a protrusion extending therefrom and defining a first opening which provides access to a tunnel or channel formed by the second portion.

The step S2802 can include initially a step of forming the fastening device. For instance, the fastening device may be formed by injection molding, either in a single injection molding step or multiple injection molding steps. Other forming methods also may be employed, such as reaction injection molding (RIM), compression molding, thermoforming, or the like.

Method 2800 also can comprise positioning or insertion of device(s) as shown and described herein with respect to an article or an item, such as apparel, footwear, luggage, a backpack, a bag, a purse, a boxing glove, a punching bag, and football or lacrosse shoulder pads (S2804).

Generally speaking, each device may be positioned or inserted relative to one or more holes, eyelets, loops, hooks, holes, openings, or the like of the item or article. For instance, in embodiments, one end of the device may be inserted through one eyelet of a shoe, passed over or under the tongue, and through the other of the eyelets. The end being passed through the eyelets may be temporarily deformed, for instance between a wearer's fingers, in order to fit through the eyelets. Furthermore, a longitudinal body portion between the ends of the device may also temporarily deform as it passes through each eyelet. In embodiments device(s) having a longitudinal groove in a longitudinal body portion thereof (e.g., item 102 in FIG. 3), the groove may make the longitudinal body portion softer and more flexible for insertion and passage of the body portion through eyelets or the like.

Figure 8:
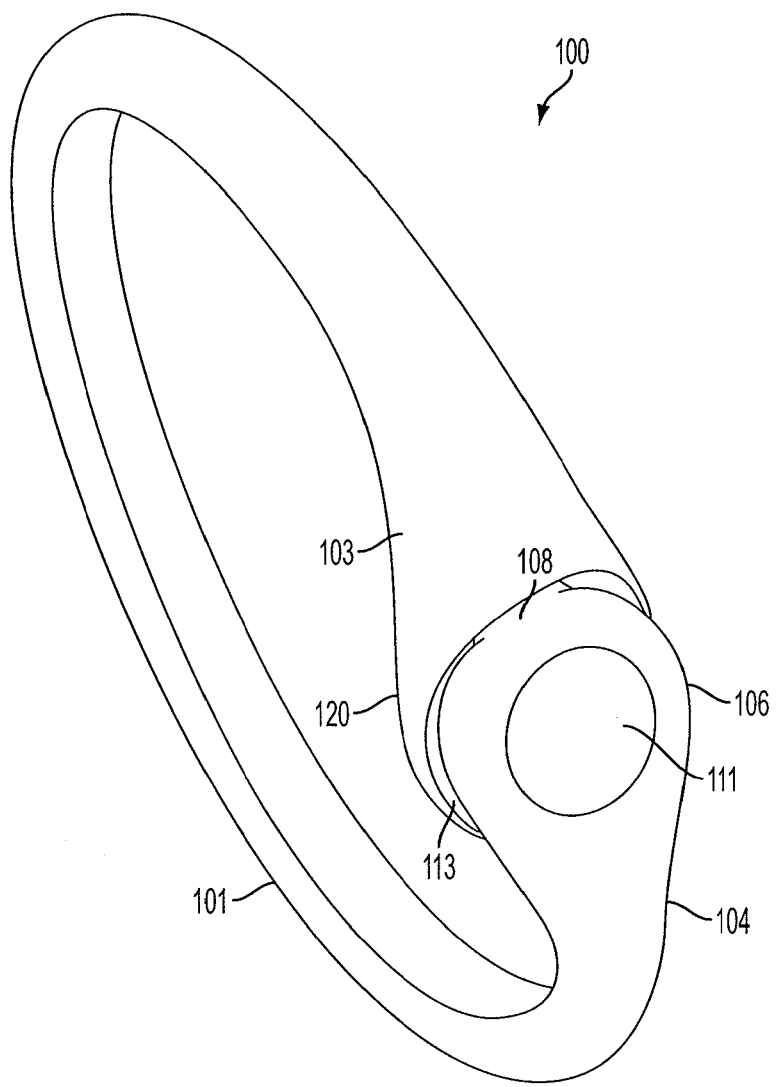
FIG. 8 is a front perspective view of a fastening device according to embodiments of the present invention, such as the device shown in FIGS. 1-7, having first and second ends thereof coupled together.
Figure 9:
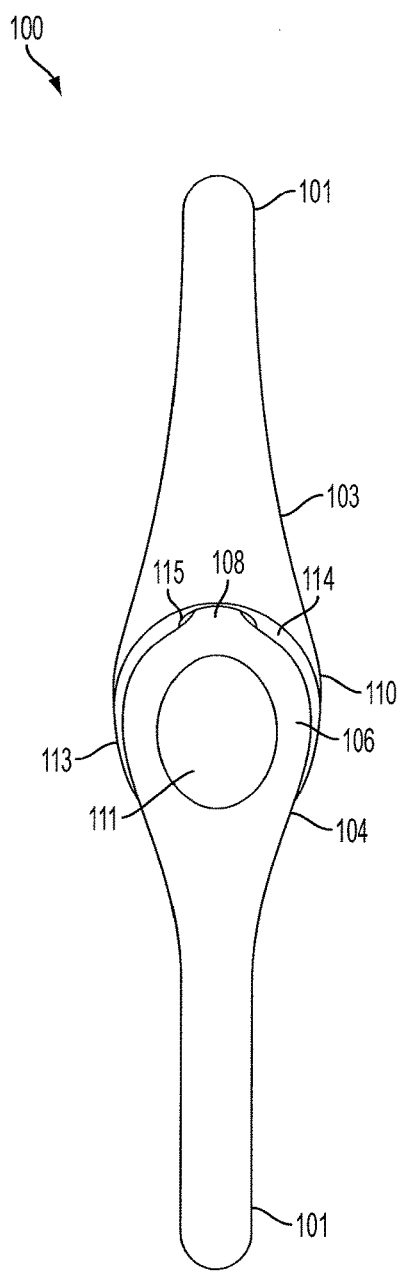
FIG. 9 is a top view of the fastening device of FIG. 8.
Figure 10:
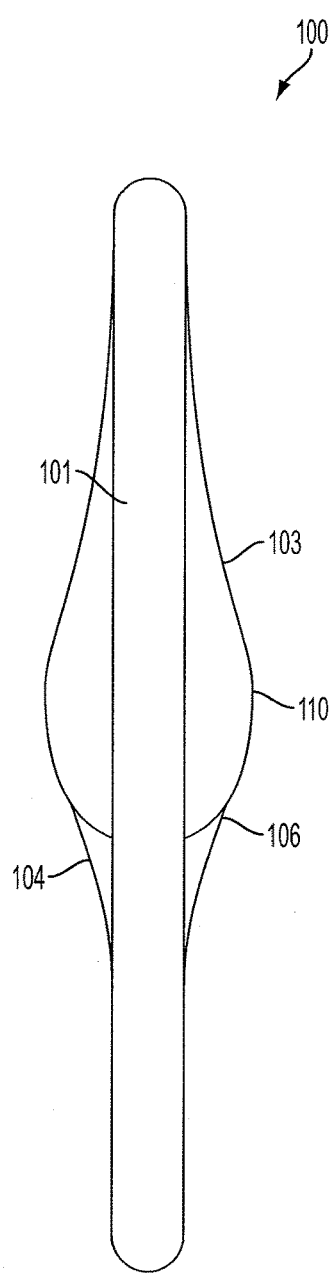
FIG. 10 is a bottom view of the fastening device of FIG. 8.
Figure 11:
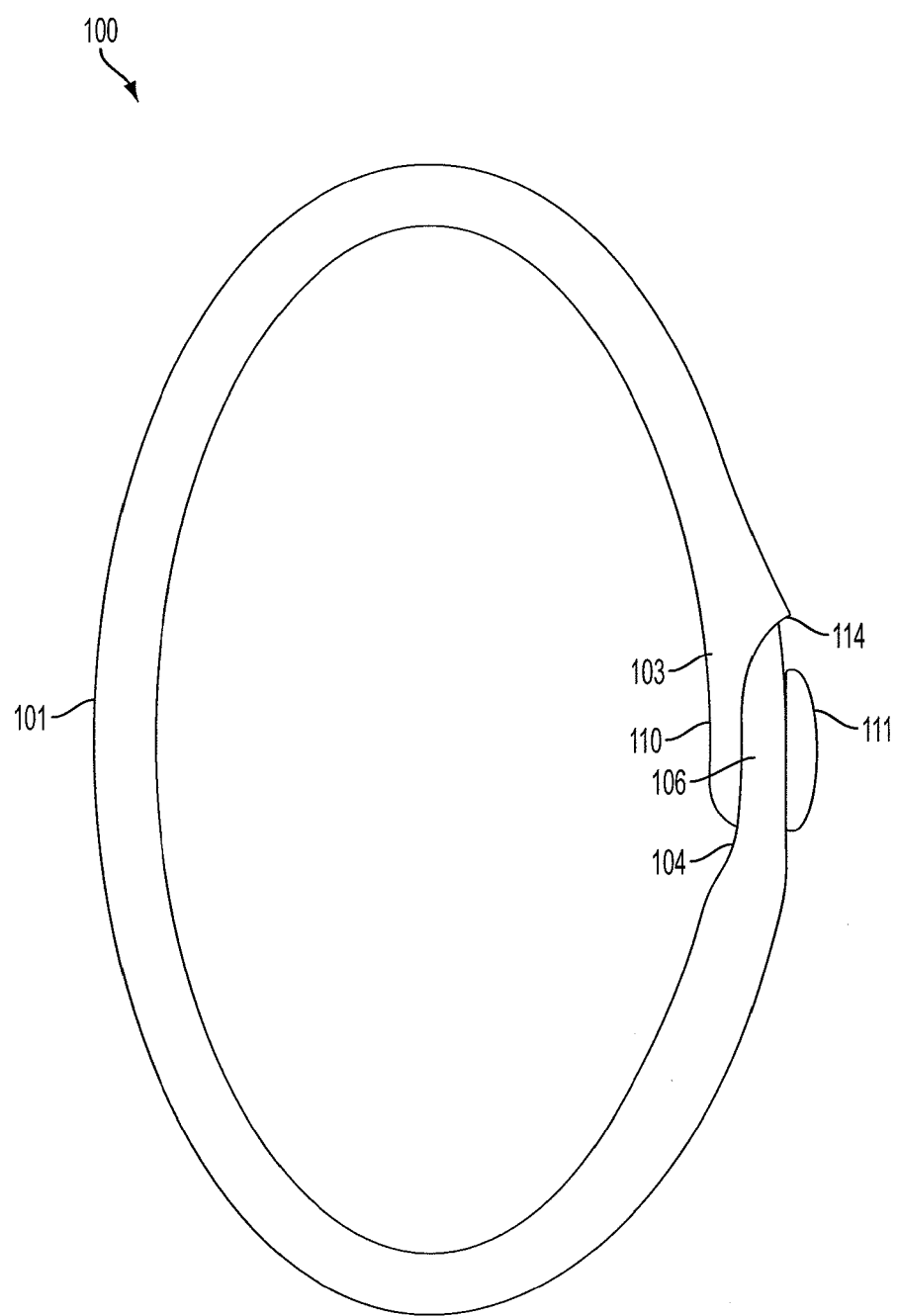
FIG. 11 is a right side view of the fastening device of FIG. 8.
Figure 12:
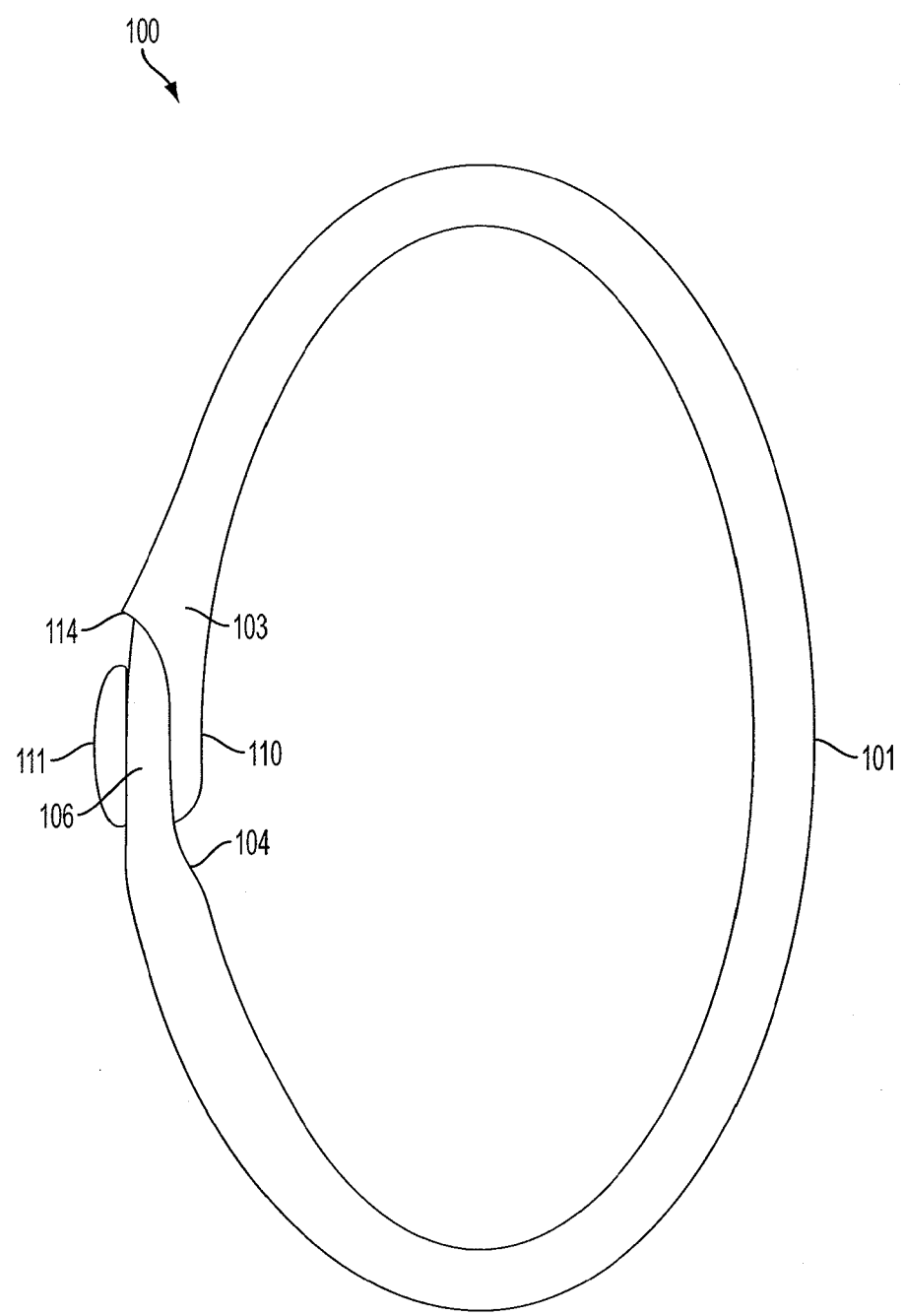
FIG. 12 is a left side view of the fastening device of FIG. 8.
Figure 13:
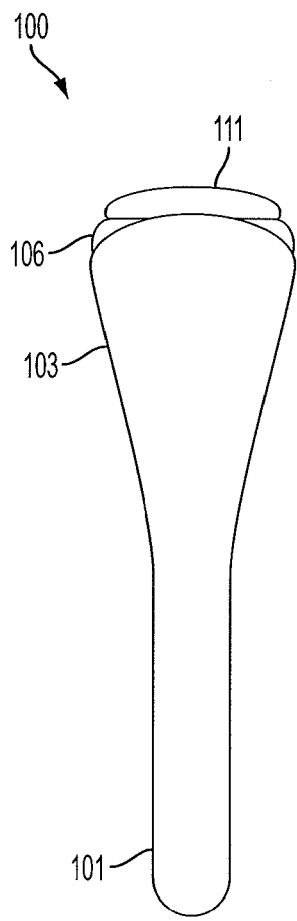
FIG. 13 is an end view of the fastening device of FIG. 8.
Figure 14:
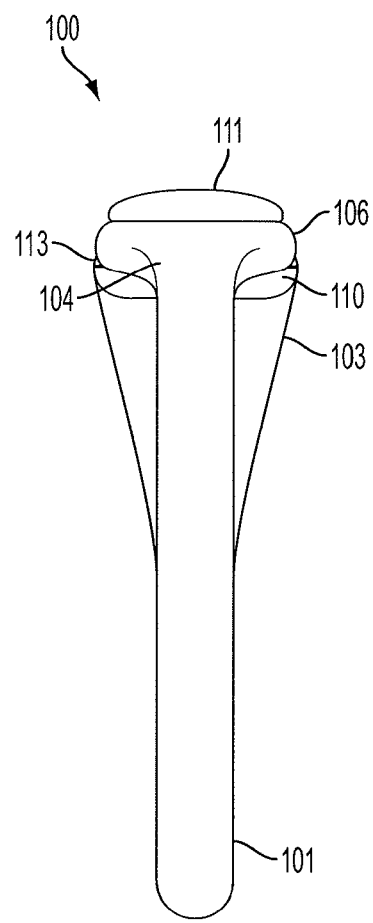
FIG. 14 is an end view opposite to the end view of FIG. 13, of the fastening device of FIG. 8.

After the device is positioned or inserted through one or more eyelets, loops, hooks, holes, openings, or the like, the device may arranged such that its ends are coupled together (S2806), as shown in FIGS. 8, 15A, and 15B, for example. Of course other disclosed and shown embodiments may have their ends connected together according to their own unique coupling mechanisms. Further, in embodiments, multiple devices may be coupled together in end-to-end fashion, thereby forming a relatively longer fastening device.

Alternatively, in embodiments such as those shown in FIGS. 21A-21C and 22A-22E, the ends of the device may not be threaded through the eyelets, loops, hooks, holes, openings, or the like as indicated above, but rather, each end may be inserted through a corresponding eyelet, loop, hook, opening, or the like. See, for instance, FIG. 23, which shows a plurality of devices 1300 from FIG. 22E having ends 1311 inserted into respective shoe eyelets on one side of a shoe. Though not shown, ends opposite ends 1311 for each device 1300 are identical to those shown and can fit into respective shoe eyelets on the other side of the shoe.

Figure 7:
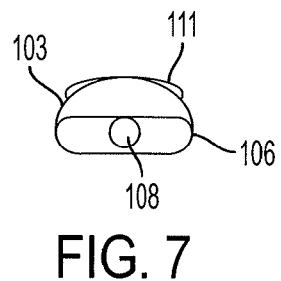
FIG. 7 is a second end view of the device shown in FIG. 1.

Though not explicitly shown in the figures, a fastening means as indicated according to item 19 in FIG. 7 of U.S. Pat. No. 7,506,420 or a variation thereof based on the configuration of the individual fastening device(s) may also be employed with embodiments of the present invention. The entire content of U.S. Pat. No. 7,506,420 is hereby incorporated by reference in its entirety into the present application.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents, and variations that are within the spirit and scope of the invention.

What is claimed is:

1. A flexible fastening device for fastening a first hole, eyelet, loop, or hook on an article of footwear or apparel and a second hole, eyelet, loop, or hook on the article of footwear or apparel, the fastening device comprising:
   a first portion including a ring;
   a second portion including a first face and a second face opposite the first face;
   a body portion between the first portion and the second portion, the body portion defining an axis;
   a projection extending from the first face, the first face surrounding a base of the projection and the projection including a sidewall; and
   a wall extending upward from the first face,
   wherein the body portion is flexible,
   wherein a tip end member extends from the ring along the axis of the body portion, and
   wherein the sidewall comprises a groove extending therearound and the groove is sized to receive a portion of an inside of the ring.

2. The flexible fastening device according to claim 1, wherein the fastening device is one-piece,
   wherein the tip end member comprises a single, flexible elongate digit as an extremity of the fastening device,
   wherein said second portion is coupled to said first portion via said body portion and the second portion defines a first opening which provides access to a channel surrounded by said second portion, and
   wherein the first opening and the channel are sized such that the digit fits therethrough and therein, respectively, with a base of the digit arranged adjacent to the first opening.

3. The flexible fastening device according to claim 2, wherein the channel is a dead end channel having an end thereof formed by said second portion.

4. The flexible fastening device according to claim 2, wherein said second portion further includes a second opening on a side of said flexible fastening device opposite a side of said flexible fastening device associated with the projection, the second opening providing access to the channel.

5. The flexible fastening device according to claim 4, wherein the digit does not project from a plane defining the second opening when a body of the digit is inside the channel and the base of the digit is arranged adjacent to the first opening.

6. The flexible fastening device according to claim 2, wherein the flexible fastening device is for use as a fastener for footwear or apparel when said first portion and second portion are coupled together, or as a piece of jewelry when either said first portion and second portion are coupled together or one of said first portion and said second portion of said flexible fastening device is coupled to the other of a second portion and a first portion of a second flexible fastening device.

7. The flexible fastening device according to claim 1, wherein a portion of the first face comprises a flange around some or all of the base of the projection in plan view.

8. The flexible fastening device according to claim 1,
wherein the sidewall of the projection in plan view is one of oval, circular, rectangular, or square, and
wherein the inside of the ring in plan view is one of circular, oval, rectangular, or square.

9. The flexible fastening device according to claim 8, wherein the plan view of the sidewall of the projection does not match the plan view of the inside of the ring.

10. The flexible fastening device according to claim 1,
wherein said second portion is coupled to said first portion via the body portion and the projection defining an anchor portion for coupling with the ring of said first portion,
wherein the inside of the ring of said first portion is sized to fit around the anchor portion.

11. The flexible fastening device according to claim 1, wherein said groove extends completely around the sidewall of the projection.

12. The flexible fastening device according to claim 1,
wherein said first portion has an extremity portion,
wherein said body portion has a bifurcated body which defines a void region between each of two portions of the bifurcated body,
wherein the void region runs from said first portion to said second portion, and
wherein said second portion has a Y-shaped channel formed on its upper face defined in-part by a projection.

13. The flexible fastening device according to claim 12, wherein, when the first portion and the second portion are coupled together, said first portion is arranged inside the channel such that a juncture where said body portion and said first portion meet is arranged at a fork of the channel, with the extremity portion of said first portion facing inwardly, toward said body portion.

14. The flexible fastening device according to claim 1, further comprising a collar adapted to attach to the body portion.

15. The flexible fastening device according to claim 14, wherein the collar encompasses an entirety of the body portion.

16. The flexible fastening device according to claim 1, wherein the projection comprises a different material than the second portion.

17. The flexible fastening device according to claim 1, wherein the first portion and the second portion are at opposing ends of the body portion.

18. The flexible fastening device according to claim 1, wherein the projection is separable from the body portion.

19. The flexible fastening device according to claim 1, wherein a portion of the first face comprises a flange.

20. A set of flexible fastening devices, each flexible fastening device according to claim 1.

21. The set of flexible fastening devices according to claim 20, wherein the set of said flexible fastening devices includes at least two flexible fastening devices each with different overall lengths.

22. The set of flexible fastening devices according to claim 20, wherein the set of said flexible fastening devices includes at least two flexible fastening devices each with a same overall length.

* * * * *

UNITED STATES PATENT AND TRADEMARK OFFICE
CERTIFICATE OF CORRECTION

PATENT NO. : 9,820,535 B2  
APPLICATION NO. : 14/377103  
DATED : November 21, 2017  
INVENTOR(S) : Frydlewski et al.

Page 1 of 1

It is certified that error appears in the above-identified patent and that said Letters Patent is hereby corrected as shown below:

On the Title Page

After (65) Prior Publication Data  
US 2015/0074955 A1   Mar. 19, 2015

Insert item (60):  
--Related U.S. Application Data  
(60) U.S. Application No. 13/367,362, filed Feb. 6, 2012--

Signed and Sealed this  
Tenth Day of April, 2018

Andrei Iancu  
*Director of the United States Patent and Trademark Office*